United States Patent
Saliba et al.

(10) Patent No.: US 7,099,102 B2
(45) Date of Patent: Aug. 29, 2006

(54) MULTIPLE FORMAT MAGNETIC STORAGE MEDIA DRIVE

(75) Inventors: George A. Saliba, Northboro, MA (US); Vernon P. Coles, Sharon, MA (US)

(73) Assignee: Quantum Corporation, San Jose, CA (US)

( * ) Notice: Subject to any disclaimer, the term of this patent is extended or adjusted under 35 U.S.C. 154(b) by 115 days.

(21) Appl. No.: 10/794,661

(22) Filed: Mar. 5, 2004

(65) Prior Publication Data

US 2005/0082407 A1   Apr. 21, 2005

Related U.S. Application Data

(60) Provisional application No. 60/513,156, filed on Oct. 20, 2003.

(51) Int. Cl.
  *G11B 15/67*   (2006.01)
(52) U.S. Cl. .................. 360/71; 360/94; 360/95; 242/332.1; 242/332.4; 242/332.7; 242/336
(58) Field of Classification Search ................ None
See application file for complete search history.

(56) References Cited

U.S. PATENT DOCUMENTS

| | | |
|---|---|---|
| 4,056,830 A | 11/1977 | Smith |
| 4,110,799 A | 8/1978 | Bergmans et al. |
| 4,349,849 A | 9/1982 | Satoh |
| 4,679,104 A | 7/1987 | Dahlerud |
| 4,802,030 A | 1/1989 | Henry et al. |
| 5,294,791 A | 3/1994 | Pahr |
| 5,309,299 A | 5/1994 | Crossland et al. |
| 5,371,638 A | 12/1994 | Saliba |
| 5,432,652 A | 7/1995 | Comeaux et al. |
| 5,452,152 A | 9/1995 | Rudi |
| 5,574,602 A | 11/1996 | Baca et al. |
| 5,737,342 A | 4/1998 | Ziperovich |
| 5,760,995 A | 6/1998 | Heller et al. |
| 5,872,672 A | 2/1999 | Chliwnyj et al. |
| 5,971,310 A * | 10/1999 | Saliba et al. ............. 242/332.4 |
| 5,995,315 A | 11/1999 | Fasen |
| 6,079,651 A * | 6/2000 | Hamming ................. 242/332.4 |
| 6,092,754 A * | 7/2000 | Rathweg et al. ......... 242/332.4 |
| 6,095,445 A | 8/2000 | Hentrich .................... 360/96.5 |
| 6,104,766 A | 8/2000 | Coker et al. |
| 6,108,159 A | 8/2000 | Nute et al. |
| 6,246,535 B1 | 6/2001 | Saliba et al. |
| 6,311,915 B1 * | 11/2001 | Rathweg .................. 242/332.4 |
| 6,344,944 B1 | 2/2002 | Stabile et al. ................ 360/94 |
| 6,375,108 B1 * | 4/2002 | Drechsler et al. ........ 242/332.4 |
| 6,398,143 B1 * | 6/2002 | Kim et al. ............... 242/332.4 |
| 6,427,934 B1 * | 8/2002 | Saliba et al. ............. 242/332.7 |
| 6,462,899 B1 | 10/2002 | Chliwnyi et al. |
| 6,490,133 B1 * | 12/2002 | Okamura et al. ........ 242/332.4 |
| 6,588,694 B1 | 7/2003 | Wilkerson |

(Continued)

*Primary Examiner*—Hoa T. Nguyen
*Assistant Examiner*—James L Habermehl
(74) *Attorney, Agent, or Firm*—Morrison & Foerster LLP

(57) ABSTRACT

Methods and systems are provided for receiving and streaming storage tape by a tape head from storage tape cartridges of varying formats in a single tape drive. In one example, an exemplary tape drive system includes a receiver, a reel driver system configured to selectively drive at least two cartridges having different cartridge formats, and a drive leader system configured to selectively couple with at least two different cartridge leader formats associated with the at least two different cartridge formats.

41 Claims, 16 Drawing Sheets

U.S. PATENT DOCUMENTS 6,594,103 B1   7/2003  Despain et al.
6,710,962 B1 * 3/2004  Caverly et al. ............... 360/71
6,918,554 B1 * 7/2005  Stamm et al. .............. 242/338

2002/0176200 A1   11/2002  Trivedi
2004/0190177 A1 * 9/2004  Christie et al. ............... 360/71

* cited by examiner

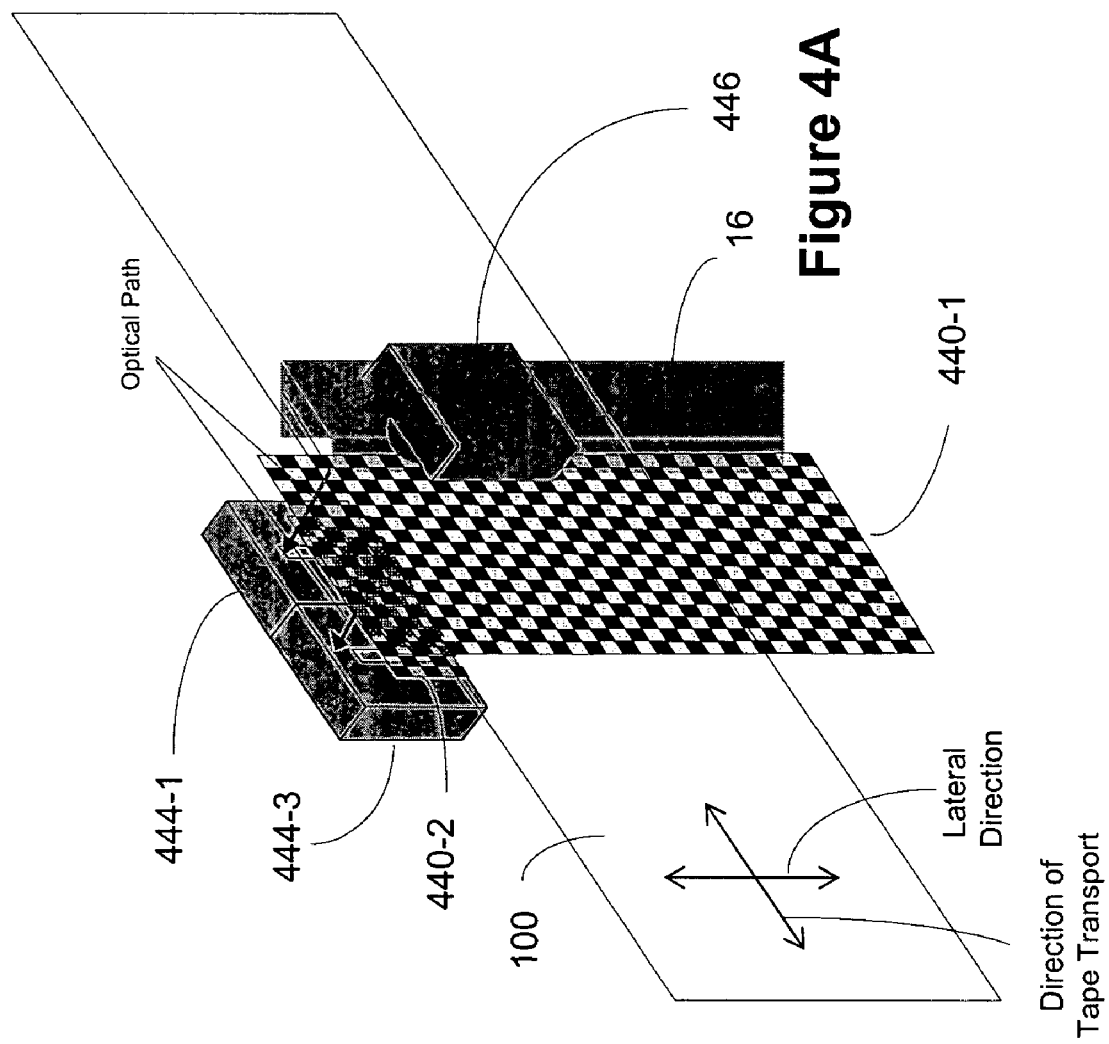

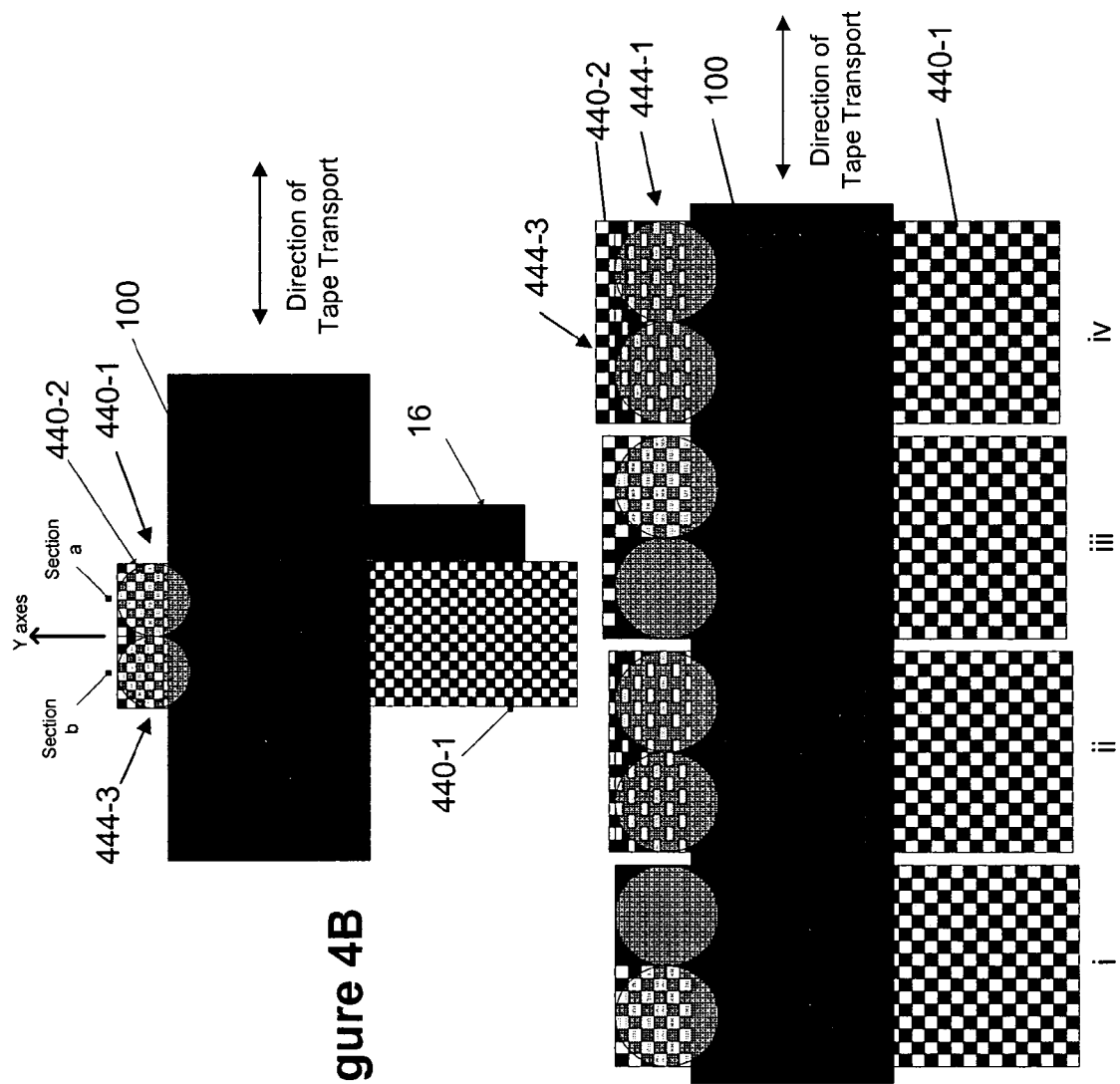

Tape Edge with Mask, Edge Motion Vertically Over Mask, 17 track crossing are detected Fig 1. Center tapped read head configuration.

MULTIPLE FORMAT MAGNETIC STORAGE MEDIA DRIVE

CROSS REFERENCE TO RELATED APPLICATION

The present application is related to earlier filed provisional patent application, U.S. Application No. 60/513,156, filed on Oct. 20, 2003, and entitled "SERVO METHODS AND SYSTEMS FOR MAGNETIC RECORDING AND READING," which is hereby incorporated by reference as if fully set forth herein.

BACKGROUND

1. Field of the Invention

The invention and its various aspects relate generally to magnetic tape storage devices and systems, and more particularly to methods and systems for receiving and driving storage cartridges of varying formats, and for head positioning servo systems for aligning a read/write head with storage cartridges of varying formats.

2. Description of the Related Art

Digital tape-recording remains a viable solution for storage of large amounts of data. Conventionally, at least two approaches are employed for recording digital information onto magnetic recording tape. One approach calls for moving a magnetic tape past a rotating head structure that reads and writes user information from discontinuous transverse tracks. Interactive servo systems are typically employed to synchronize rotation of the head structure with travel of the tape. Another approach is to draw the tape across a non-rotating head at a considerable linear velocity. This approach is sometimes referred to as linear "streaming" tape recording and playback.

Increased data storage capacity, and retrieval performance, is desired of all commercially viable mass storage devices and media. In the case of linear tape recording a popular trend is toward multi-head, multi-channel fixed head structures with narrowed recording gaps and data track widths so that many linear data tracks may be achieved on a tape medium of a predetermined width, such as one-half inch width tape. To increase the storage density for a given cartridge size the bits on the tape may be written to smaller areas and on a plurality of parallel longitudinal tracks. As more data tracks are recorded on a tape, each track becomes increasingly narrow. The tape therefore becomes more susceptible to errors caused from the tape shifting up or down (called lateral tape motion or "LTM") in a direction perpendicular to the tape travel path as the tape passes by the magnetic head. LTM may be caused by many factors including, tape slitting variations, tension variations, imperfections in the guiding mechanism, friction variations mainly at the head, and environmental factors such as heat and humidity. These factors affect LTM in various ways. Some may cause abrupt momentary jumps while others may cause a static shift. Generally, LTM is unpredictable and unrepeatable.

In multi-head, multi-channel magnetic tape storage systems, random lateral tape motion is generally a limiting factor in achieving higher track densities and thus higher user data capacity per tape. In order to maintain proper alignment of the head with the storage tape and data tracks on the tape, the tape is generally mechanically constrained to minimize LTM and data retrieval errors. Miss-registration between the head and the data track can cause data errors during readback and data loss on adjacent tracks during writing.

Various techniques for increasing the track density on magnetic tape employ recording servo information on the tape to provide positioning information to a tape drive system during writing and/or reading processes. Some systems magnetically record a continuous track of servo information which is then read and used as a position reference signal. For example, a variety of techniques have been used including dedicated and embedded magnetic servo tracks, time and amplitude magnetic servo tracks, and the like. Other systems may intersperse or embed servo information with user data. Exemplary tape drive systems and methods are described, for example, in U.S. Pat. Nos. 6,246,535, 6,108,159, and 5,371,638, and U.S. patent application Ser. No. 09/865,215, all of which are hereby incorporated by reference herein in their entirety.

Servo methods and drives are generally format specific, e.g., relating to a specific cartridge size, data format, and servo format. What is desired are methods and systems for more accurately positioning read and/or write heads with respect to data tracks of a magnetic storage tape in a tape drive over varying data formats and cartridge formats. Additionally, tape drive systems that may receive and drive cartridges of varying formats, e.g., varying in cartridge size, reel configuration, data format, tape egress, are desired.

BRIEF SUMMARY

In one aspect of the present invention methods and systems are provided for receiving and streaming storage tape by a tape head from storage tape cartridges of varying formats in a single tape drive.

In one example, a tape drive system for use with multiple cartridge formats is provided. The exemplary tape drive system includes a receiver, a reel driver system configured to drive at least two cartridges having different cartridge formats, and a drive leader system configured to selectively couple with at least two cartridge leaders having two different cartridge leader formats associated with the at least two different cartridge formats.

In one example, an exemplary tape drive leader system includes a first drive leader portion configured to selectively couple with a first cartridge leader format or a second drive leader portion, the second drive leader portion configured to couple with a second cartridge leader format. In another example, an exemplary tape drive leader system includes a path which at least one buckle mechanism travels to attach to the at least two different cartridge formats.

In another example, a method for buckling a drive leader system of a tape drive to multiple cartridge formats having varying cartridge leader formats is provided. The method includes positioning a cartridge within a receiver of a tape drive, selectively engaging the cartridge leader with a drive leader system at one of at least two separate locations to provide one of at least two different egresses of storage tape from the cartridge into the tape drive.

The servo systems and methods described herein may be employed in a tape drive configured to receive cartridges of varying formats and servo a recording head with respect to the recording tape. A suitable controller may determine the relative position of the head to the tape, thereby allowing the controller to adjust the head position to achieve a desired position with respect to the tape. Additionally, the servo systems and methods described herein may be employed with various other servo methods known in the art. For example, magnetic, optical, open loop, mechanical, and the like.

Various aspects and examples of the present inventions are better understood upon consideration of the detailed description below in conjunction with the accompanying drawings and claims.

BRIEF DESCRIPTION OF DRAWINGS

FIGS. 4A, 4B, and 4C illustrate various views of another exemplary servo system including an optical servo system configured to sense the edge of a storage medium;

DETAILED DESCRIPTION

Figure 1:
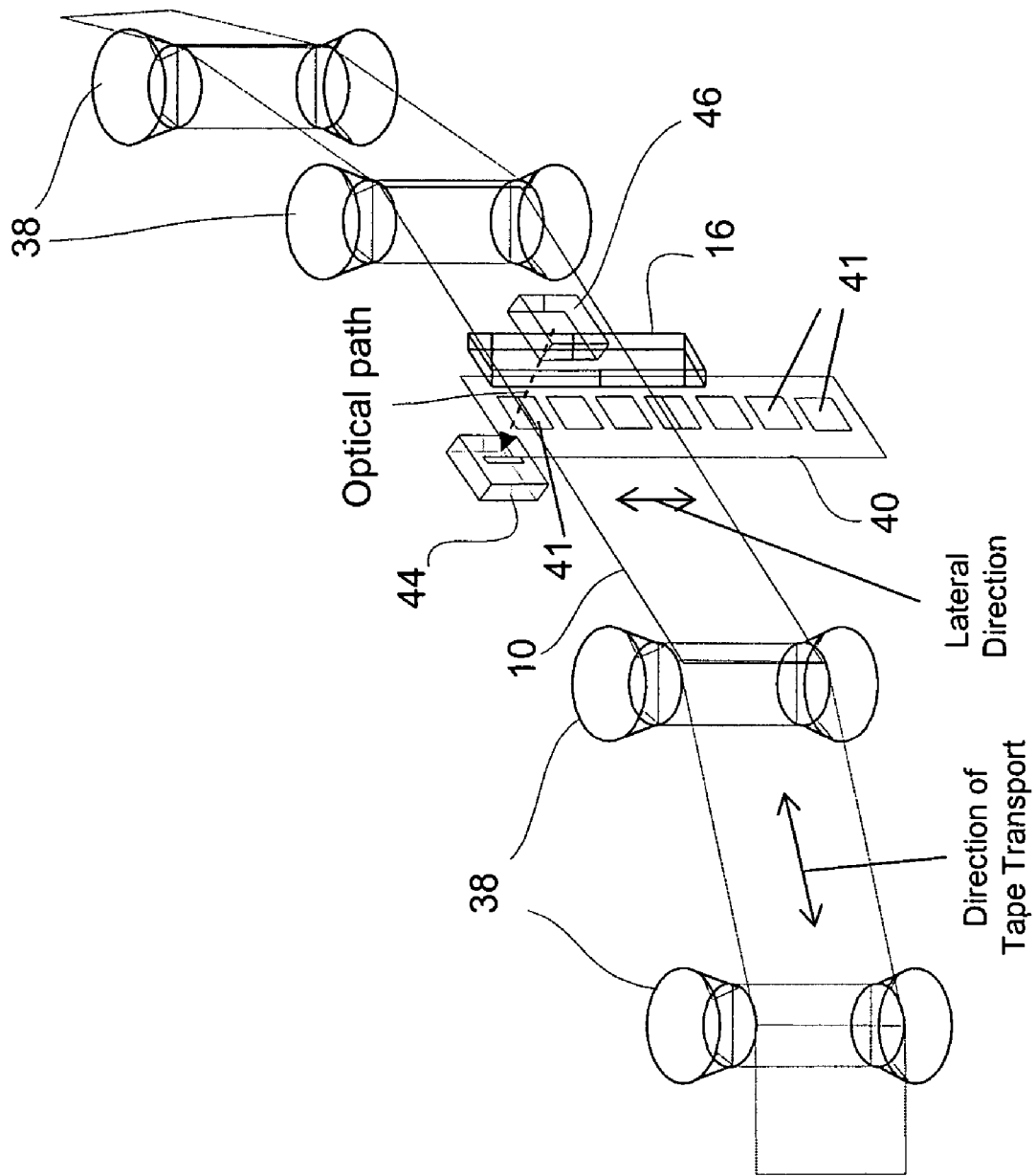
FIG. 1 illustrates an exemplary servo system including an optical servo system configured to sense the edge of a storage medium.

Various methods and systems for receiving and reading/writing to tape cartridges of varying formats are provided. Additionally, methods and systems for sensing lateral tape motion and providing calibration and/or positional information for a servo system, e.g., a primary servo system or subsystem servo, are provided. The following description is presented to enable a person of ordinary skill in the art to make and use the invention. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions.

Accurately positioning a transducer head with respect to a storage tape and data tracks within a tape drive during writing and reading processes is one of the main challenges in the area of magnetic storage tape systems. Generally, a closed loop servo system, deployed by the tape drive electromechanical system, utilizes an estimate of the head's position relative to the storage tape to align the transducer head to a data track position. Exemplary methods and systems described below gather positional information for the positioning of a transducer head relative to data tracks by utilizing existing data structures on a magnetic storage tape and sensing an edge of the storage tape. The exemplary methods and systems may be used without servo data or separate servo systems including, e.g., mechanical structures to mount an optical system or the like for detecting servo positioning information. With reduced mechanical structure, there may be an increase in servo actuator response, enabling higher actuator band width and finer track width resolution.

Additionally, because the system uses existing (or previously written) data structures and the tape edge for servoing, a drive system may advantageously write to and read from various format storage cartridges and data formats. For example, Super Digital Linear Tape ("Super DLT" or "SDLT") drives, and Linear Tape Open ("LTO") drives may utilize exemplary servo systems that are compatible with both magnetic servo of LTO and optical servo of Super DLT. In one example, a servo system detects at least one previously written data track (referred to herein as a "reference track") to provide positional information for a read/write head relative to a presently accessed track (referred to herein as an "active track"). Additionally, an optical servo system detects at least one edge of the tape to provide relative positional information for the read/write head. The exemplary methods and systems may assist various additional servo system(s) or subsystem(s) of a tape drive to align the read/write head with data tracks during reading or writing processes.

Additionally, an exemplary tape drive system is provided to accept magnetic storage cartridges of varying formats, e.g., cartridge sizes, cartridge leader pin locations, gear pitches, storage tape egresses, and the like. For example, a tape drive system may equally accept and drive both SDLT cartridges and LTO cartridges, and perform read/write processes with both SDLT and LTO recording formats. Further, the exemplary servo methods and systems may be included to assist the drive with reading/writing processes.

Exemplary tape drive systems and methods that may be used with the various exemplary systems and methods described herein include, for example, those described in U.S. Pat. Nos. 6,246,535, 6,108,159, and 5,371,638, and U.S. patent application Ser. No. 09/865,215, all of which are hereby incorporated by reference as if fully set forth herein. Those of ordinary skill in the art will recognize, however, that various other suitable tape drive systems and servo systems (perhaps with some modification that will be apparent to those of ordinary skill in the art) may be used with one or more of the exemplary systems and methods described.

In one exemplary servo system, magnetic servo information associated with the relative position of a previously written data structure (e.g., a previously written data track), and optical servo information associated with the relative position of an edge of the magnetic storage medium (e.g., 0.5 inch storage tape), are used to sense relative position of the storage tape and magnetic read/write head. The exemplary servo methods and systems may be used with multiple format data cartridges, e.g., SDLT or LTO cartridges. Accordingly, in another aspect, which may be used alone or in combination with the exemplary servo method, a drive system is provided for receiving and driving data cartridges of varying formats, e.g., SDLT and LTO cartridges. The exemplary drive system may include a drive configured for multiple cartridge formats and a drive leader system to take up varying cartridge leader formats associated with the multiple cartridge formats.

The following description details exemplary optical servo methods, exemplary magnetic read servo methods, and exemplary drive systems configured for multiple cartridge formats. The exemplary methods and systems may be used alone or in combination with other methods and systems.

Optical Servo Methods and Systems:

The relative position of a read/write head with respect to data track locations can be accurately estimated if the relative position of the read/write head with respect to the edge of the storage medium or tape is known. The relative position of the tape edge may be obtained by optically sensing the position of the edge of the storage tape with respect to the head element with a suitable optical system.

FIG. 1 illustrates one exemplary optical servo system for sensing the relative position of an edge of a storage tape 10. The optical servo system includes a light source 46, stationary optical sensing device 44, and a patterned mask 40 configured to sense the edge of storage tape 10. Storage tape 10 is guided by rollers 38 from a supply reel (e.g., within a cartridge), to a take-up reel (e.g., within a tape drive system) and adjacent read/write head 16 and the optical servo system.

An optical path is shown in FIG. 1 extending between light source 46 and optical sensing device 44. In one example, sensing device 44 includes an area or linear detector aligned along the lateral direction. Sensing device 44 detects light through a window blocked by the optical image of the edge of storage tape 10 on one side and an optically coded mask 40 attached or in a fixed spatial relationship to the read/write head 16 on the other side. Mask 40 includes at least one area of varying transparency to light from light source 46, e.g., aperture 41, and mask 40 is coupled to or in a fixed spatial relationship to head 16. During operation, tape 10 will at least partially obstruct the at least one aperture 41 to create at least one window defined by the area of aperture 41 less the area of tape 10 which overlaps aperture 41 along the optical path between light source 46 and sensing device 44. In this example, the lateral length of the aperture is set less than the width of tape 100.

Light source 46 illuminates, e.g., with incoherent light, the at least one window formed by tape 10 and aperture 41. Sensing device 44 detects light passing through the window and provides a measure of the relative position of the edge of tape 10 to the head 16. A controller may adjust the position of head 16 in response to signals from sensing device 44 associated with the detected light. For example, the controller may adjust the position of head 16 to maintain the intensity of the detected light at a particular value, thereby keeping the window at the same or similar size.

In one example, sensing device 44 includes a transmissive optical sensor. Transmissive optical sensors are well established and characterized devices in the industry. They are also relatively inexpensive and readily available, however, various suitable sensors may be used, e.g., CCD or CMOS devices. Changes to the read/write head and tape path assembly in existing drive systems, such as the SDLT drive, are generally minor and inexpensive and will be easily recognized by those of ordinary skill in the art.

EXAMPLE I

To test the feasibility of using a tape edge sensor and track the LTM of a storage tape, an optical servo system including a transmissive optical sensing device similar to that shown in FIG. 1 was attached to an SDLT220 drive, manufactured by Quantum Corporation. The sensing device was positioned such that it monitored the position of the top edge of the tape relative to the position of the read/write head. The gain and offset of the accompanying electronic circuitry were set so that an analog signal was generated with a range of 0 to 3 volts that corresponded to approximately five 24-micron wide SDLT220 format data tracks. The analog signal was used as an input to an A/D converter on the SDLT220 tape drive. Each 0.6 volt change in signal (44 out of 256 A/D bits) represented approximately 24 microns.

The tape edge sensor signal was calibrated and suitable firmware was written for the SDLT220 to test the ability to track to the tape edge sensor. Two conditions were tested:

1. The drive was loaded and calibrated with a conventional SDLT220 tape and several data tracks were written in conventional SDLT220 servo mode, i.e., using the optical tracking servo in the drive. The data tracks were then read back by the drive using the optical tracking servo. As the drive was reading, a command sequence was sent to the drive via a diagnostic communication port that switched the drive from using the conventional optical tracking servo to a tape edge servo system (substantially as shown and described in FIG. 1). The drive continued reading the data track within reasonable data error rates using the tape edge servo system. Additionally, the drive was able to alternate between standard optical tracking servo and the tape edge servo system while continuing to read the data.

2. The drive was loaded and calibrated with a conventional SDLT220 tape, where the beginning of each forward data track was written using the conventional SDLT220 optical tracking servo. Part way down the track, a command sequence was sent to the drive via a diagnostic communication port that switched the drive from optical tracking servo to the tape edge servo, and the remainder of the track was written using the tape edge servo. The data tracks were read back using the optical tracking servo for the beginning of each track. Part way through each forward track, a special command sequence was sent to the drive via a diagnostic communication port which switched the drive from using the conventional optical tracking servo to the tape edge servo. The drive was able to continue reading the tracks within reasonable data error rates.

In another exemplary optical servo system, an optical sensor and an optically encoded mask attached to the read/write head are provided. In this example, the mask(s) include at least two apertures or transparent portions. The tape, bounded by a first edge, may partially obstruct a first aperture to create a first window, and the tape, bounded by a second edge opposite the first edge, may partially obstruct a second aperture to create a second window. In this manner, if lateral tape motion enlarges the first window, it reduces the second window.

A sensing device may include a first detector for detecting light from the first window, and a second detector for detecting light from the second window. By virtue of the light detected by the first and second detectors, the controller is provided with information concerning relative position of the tape to the read/write head and the direction of motion of the tape with respect to the mask.

A light source may include a first light source for illuminating the first aperture, and a second light source for illuminating the second aperture. The controller may control the first and second light sources to compensate for ambient effects on the determination of the relative position of the tape to the head, such as ambient light and temperature.

The servo system may also include a third aperture in the lateral direction, and third and fourth detectors. The third detector detects light through the third aperture obstructed by the tape bounded by the first tape edge, and the fourth detector detects light through the fourth aperture obstructed by the tape bounded by the second tape edge. The total light measured by the third and fourth detectors should be constant, assuming no ambient effects, if the tape width is constant. Thus, any change in the total light represents a variation in the tape width, for example, due to tape edge irregularities. By virtue of measuring the light with the third and fourth detectors, the controller may compensate for tape edge irregularities.

Figure 2:
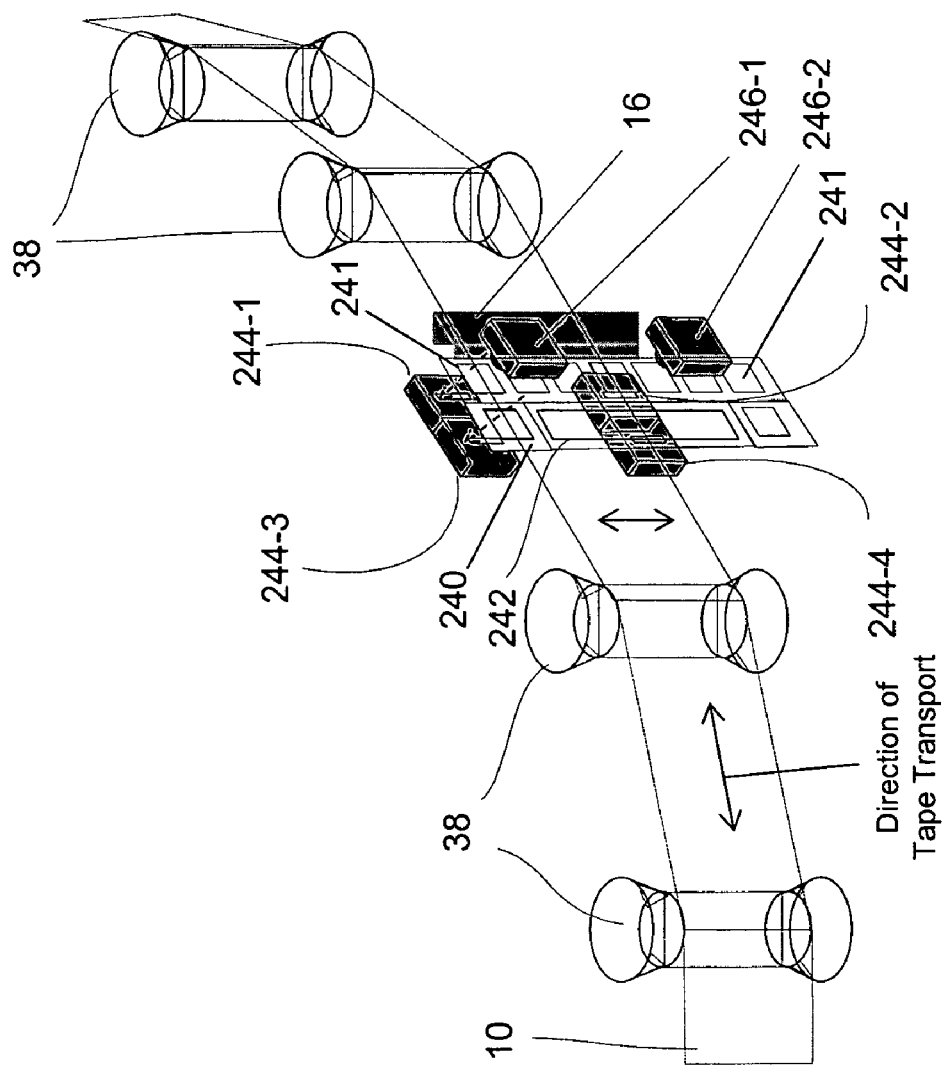
FIG. 2 illustrates another exemplary servo system including an optical servo system configured to sense the edge of a storage medium.

FIG. 2 illustrates an exemplary system having one or more masks with first, second, and third apertures. In particular, optical paths of four optical sensing devices or sensors 244-1, 244-2, 244-3, and 244-4 are at least partially blocked from light sources 246-1 and 246-2 by images of the opposing edges of tape 10; two sensors 244-1, 244-3 aligned with the top edge and two sensors aligned with the bottom edge 244-2, 244-4. An optically coded mask 240 is attached or fixed in place relative to read/write head 16. Sensors 244-1, 244-2, 244-3, 244-4 provide four signals, two of which (sensors 244-1, 244-2) are proportional to the relative position of the head with respect to the edge of the tape 10. The vertical portion of mask 240 corresponding to sensors 244-1, 244-2 includes a column of apertures 241, where each aperture 241 may be shorter in the lateral direction than the width of tape 10. Additionally, sensors 244-3, 244-4 may provide signals proportional to the lateral motion of the tape as registered by the tape edge motion. The vertical mask portion corresponding to sensors 244-3 and 244-4 includes a long vertical aperture 242 that may be longer in the lateral direction than the width of tape 10 and transparent throughout the expected range of LTM. In other example, two or more masks may be used in place of a single mask 240.

The following equations represent the components of motion for each sensor output:

$$b1 = K_{11}*(hp-LTM)$$

$$b2 = K_{21}*(1-hp+LTM)$$

$$b3 = K_{12}*(1-LTM)$$

$$b4 = K_{22}*(LTM)$$

where b1, b2, b3, b4 are the sensor outputs corresponding to sensors 244-1, 244-2, 244-3, 244-4 respectively, and hp and LTM represent the head and tape motions upward in FIG. 2 (normalized to: 0<hp−LTM<1). $K_{nn}$ represent the gain coefficient for each sensor, which depends on the light source intensity and dimensions of the mask apertures 241, 242. The output value of the sensors also varies as a function of ambient temperature and light intensity. This dependence on the ambient temperature and light should be minimized in order to achieve accurate scaling for the output of the sensors.

Figure 3:
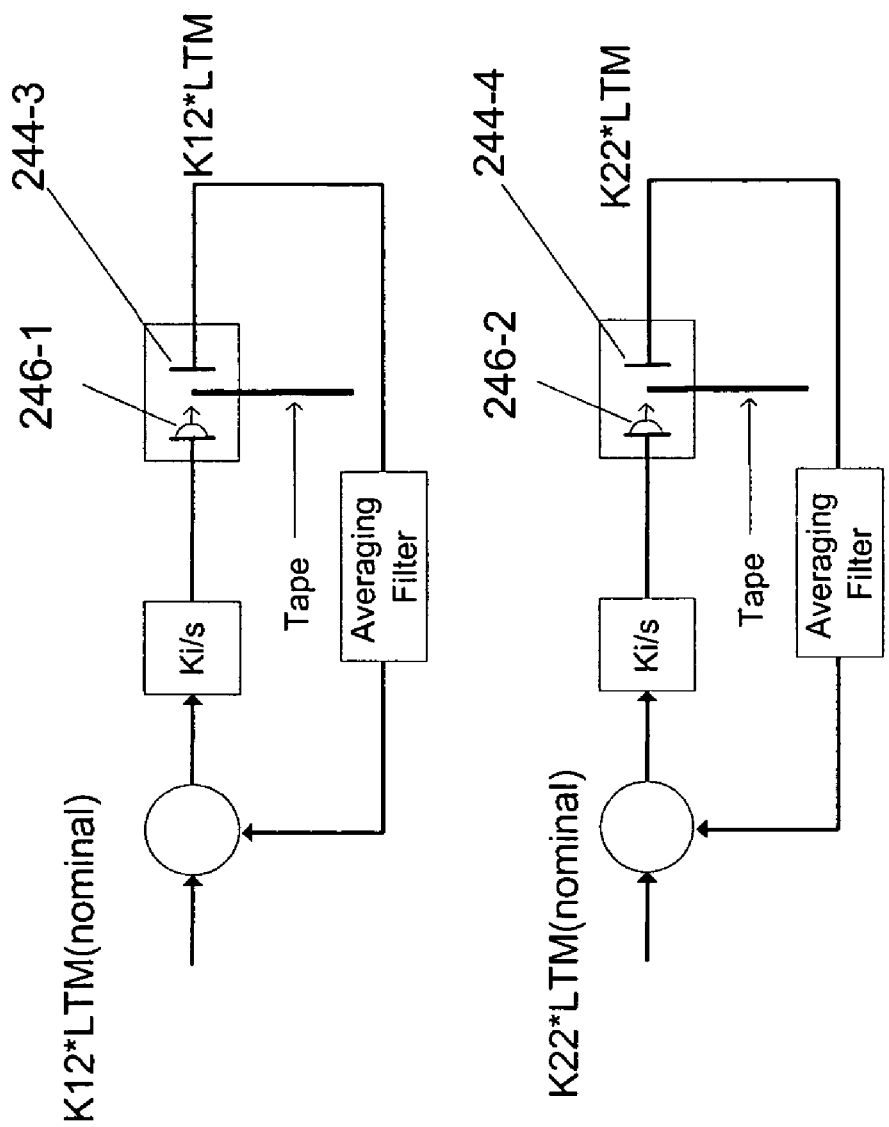
FIG. 3 illustrates an exemplary feedback loop for a servo system.

The mean value of the LTM should remain constant (because the tape is kept stationary with respect to the sensor location) such that the average values of b3 and b4 will remain substantially constant in the absence of ambient temperature and light variation. Therefore, two feedback control loops, e.g., as illustrated in FIG. 3, which would modify the intensity of the light source and keep the average values of b3 and b4 to a nominal value ($K_{12}$*LTM(nominal); $K_{22}$*LTM(nominal)), are sufficient to minimize the sensitivity of $K_{12}$ and $K_{22}$ in the above equations to ambient temperature and light.

Light source 246-1 illuminates both sensors 244-1 and 244-3. Light source 246-2 illuminates both sensor 244-2 and 244-4. Given that the ambient light and temperature variations are substantially the same for 244-1, 244-3 and 244-2, 244-4, the exemplary method will also minimize the sensitivity of $K_{11}$ and $K_{21}$ to these variations. Both $K_{11}$ and $K_{21}$ can be set to equal values by the feedback control loops:

$$K_{12}*LTM(nominal) = K_{22}*LTM(nominal), \text{ where}$$
$$K_{12} = K_{22} = Kr; K_{11} = K_{21} = Ks$$

Then the value of Ks in the linear region of the sensor can be determined by the calibration techniques initiated by the servo subsystem.

Therefore a relative position signal, $$Pr = b2 - b1 = Ks*(1-2hp+2LTM)$$

represents the resultant relative position of the head with respect to the edge of the tape.

If the tape edge is damaged, however, the sensor signals b1, b2, b3, and b4, individually, will not accurately register the relative head position with respect to the storage tape or data tracks. One exemplary method of improving the accuracy of the positioning signal, in the presence of tape edge damage, is to determine the common and differential components of these signals as a means to distinguish between tape motion, e.g., LTM, and tape edge irregularities from tape edge damage and the like.

For example, if Td1 and Td2 represent the upper and lower tape edge irregularities respectively, then b3 and b4 can be rewritten as:

$$b3 = Kr*(LTM+Td1)$$

$$b4 = Kr*(1-LTM+Td2)$$

Td, the measure of tape edge irregularities is determined by:

$$Td = b3 + b4 = Kr(1+Td1+Td2)$$

The Td signal can be monitored in order to apply a filter (such as a low pass filter) to the signal Pr, thus reducing the sensitivity of Pr to Td. For example, the filter could decrease its cutoff frequency in response to increasing Td, thereby reducing the sensitivity of the filtered Pr to the most recent values of Pr that are contaminated by Td.

Those of ordinary skill in the art will recognize that the above example is illustrative only and various other system configurations, feedback methods, and the like are possible. For example, various light sources, optical sensors, masks, feedback loops, etc., may be employed in various numbers and configurations. Additionally, the exemplary methods and systems may be carried out in firmware, software, hardware, or any combination thereof.

FIGS. 4A, 4B, and 4C illustrate an exemplary optical servo system including two stationary transmissive optical sensors 444-1, 444-3 and two optically encoded transparent masks 440-1, 440-2 provided to determine positional information. One mask 440-1 is coupled to the read/write head and a second mask 440-2 is attached or stationary with respect to the optical sensors 444-1, 444-3. The optical sensors 444-1, 444-3 may be located side-by-side in the longitudinal direction or direction of tape transport. The stationary mask 440-2 includes two side-by-side sections (see FIG. 4B), which may be (at least in part) spatially complementary to each other. For example, one section may be a mirror image of the other section about a y-axis lying in the lateral direction. Stationary mask 440-2 may comprise rows, each row corresponding to a data track on a recording tape, which at least partially obstructs light to the optical sensing elements. In another example, each stationary mask section may comprise a checkerboard pattern of alternating shapes, such as squares or rectangles.

The moving mask 440-1 attached or in a fixed relationship relative to head 16 may include a pattern, such as a checkerboard pattern, corresponding to the pattern on one section of stationary mask 440-2. The moving mask 440-1 may have a width in the longitudinal direction that is greater than or equal to the width of the stationary mask 440-1. As head 16 moves in the lateral direction, the moving mask 440-1 overlays the stationary mask 440-2 between light source 446 and sensors 440-1, 440-2. For a mask pattern comprising a checkerboard pattern, the overlay of a moving mask 440-1 row over a stationary mask 440-2 row is detected by the optical sensors 444-1, 444-3. Each row crossing may correspond to a tape data crossing, thereby providing an indication of lateral position of head 16 to sensors 444-1, 444-3. As tape 100 moves laterally, the light is obstructed to sensors 444-1, 444-3. The total light reaching the sensors 444-1, 444-3 through the masks 440-1, 440-2 corresponds to lateral tape motion, i.e., the total overlay of the tape 100 over the sensors 444-1, 444-3. Using the information concerning relative position of head 16 to sensors 444-1, 444-3 and lateral tape motion, a controller (not shown) of this example determines relative position of head 16 to tape 100, allowing control of the position of head 16 with respect to tape 100. In particular, the correspondence of the mask rows to data tracks provides fine measurement and control of the relative position of head 16 to the data tracks.

More specifically, the optical paths between light source 46 and two stationary transmissive optical sensing devices 444-1, 444-3 are blocked by the image of the edge of tape 100, and two pattern encoded mask bars 440-1 and 440-2, one attached to the moving read/write head 16 and the other stationary with respect to the optical sensing devices. Sensing devices 444-1, 444-3 provide two position signals as the read/write head 16 moves laterally with respect to tape 100. The two position signals are complementary to each other (e.g., 180 degrees out of phase) and quantized in nature to provide direction and magnitude of an offset.

FIGS. 4B and 4C illustrate patterns included with both masks 440-1 and 440-2 in greater detail over varying offset positions. The stationary mask 440-2 has two sections (a, b) positioned side-by-side along the direction of tape transport, each section having a checkerboard pattern with black (optical blocking) and white (optical transparent) blocks, sections a and b. Each section a, b is the mirror image of the other section about the y-axis. In one example, the size of the square or rectangular block of the checkerboard pattern can be associated with data track widths, e.g., a subdivision or multiple of the data track width. Those of ordinary skill in the art will recognize that shapes other than squares may be employed such as rectangles, triangles, circles, and the like.

In one example, the dimensions of the squares are chosen to be 0.5 data track widths. Each section of the stationary mask 440-2 blocks, at least partially, the optical path of one of the two sensors 444-1, 444-3 (shown as circles in FIG. 4C). The moving mask 440-1 may have a homogeneous checkerboard pattern with the same square block dimensions as the stationary mask. In one example, mask 440-1 is wider than mask 440-2 and head 16, but in other examples mask 440-1 may have various sizes including equal to or smaller than mask 440-2 in the lateral direction.

FIG. 4C illustrates several alignments (shown as i, ii, iii, and iv) of masks 440-1, 440-2 and the edge of tape 100 as head 16 (not shown in FIG. 4C) and mask 440-1 move across the width of tape 100. As illustrated in FIG. 4C, each optical sensing element goes through a cycle of being semi-blocked by the two masks 440-1, 440-2 and tape 100 as the black and transparent squares line up to respective black and transparent squares, to being completely blocked as the black and the transparent squares of the moving mask 440-2 line up to respective transparent and black squares of the stationary mask 440-1. Note that because the stationary mask 440-2 sections are complementary, one sensor experiences minimum light transmission while the other sensor experiences maximum light transmission. Since the optical path for both sensors experiences cycles of maximum light transmission to minimum light transmission for each track length's motion of the head, the resulting positioning signals generally have a wider dynamic range (and better signal-to-noise ratio) than previous servo systems. With proper signal processing, as will be apparent to those of ordinary skill in the art, the system provides a null position signal for each row of squares shown in FIG. 4C.

In one example, if signals b1 and b3 represent the outputs of sensors 444-1 and 444-3, respectively, signal b1−b3 represents a signal proportional to the position of the read/write head 16, and signal b1+b3 represents a signal proportional to the position of tape 100 (i.e., related to LTM). Using well known servo system techniques, a servo controller may use the sum and difference signals to determine and control the position of the read/write head 16 relative to the edge of tape 100.

Figure 5:
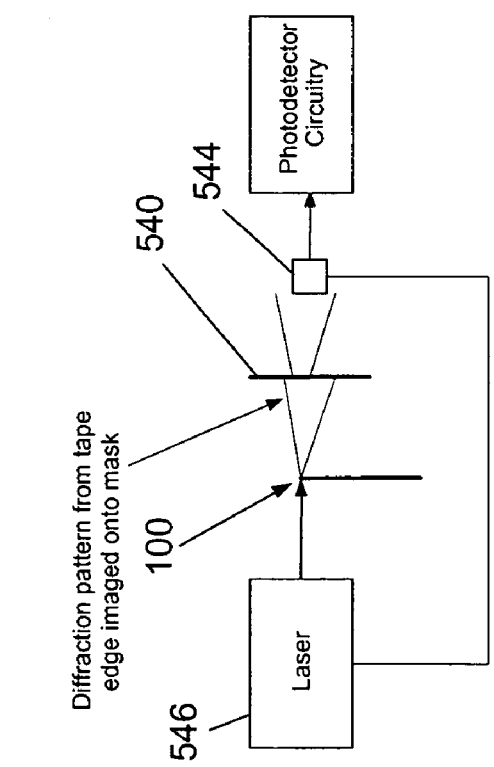
FIG. 5 illustrates another exemplary servo system including an optical servo system configured to sense the edge of a storage medium.

FIG. 5 illustrates another exemplary optical servo system where an optical source 546 illuminates an edge of a storage tape 100 creatimg a diffraction pattern to provide servo information. Operation of the exemplary servo system may be described by following the light path from left to right in FIG. 5. Light source 546, e.g., a laser, provides illumination that diffracts over tape edge 100, creating a diffraction pattern, which is imaged onto and passes through mask 540 creating an output mask diffraction pattern. The output diffraction pattern is detected by sensor 544 and may be processed to provide relative positional information of tape 100 within the system.

In one example, light source 546 includes a coherent light source, e.g., a laser diode or the like. Sensor 544 may include any suitable optical sensor array or line scanner such as a CCD or CMOS device. Light source 546, sensor 544, and mask 540 may be mechanically fixed in a known physical relationship relative to tape 100 and a head actuator (not shown).

Figure 6:
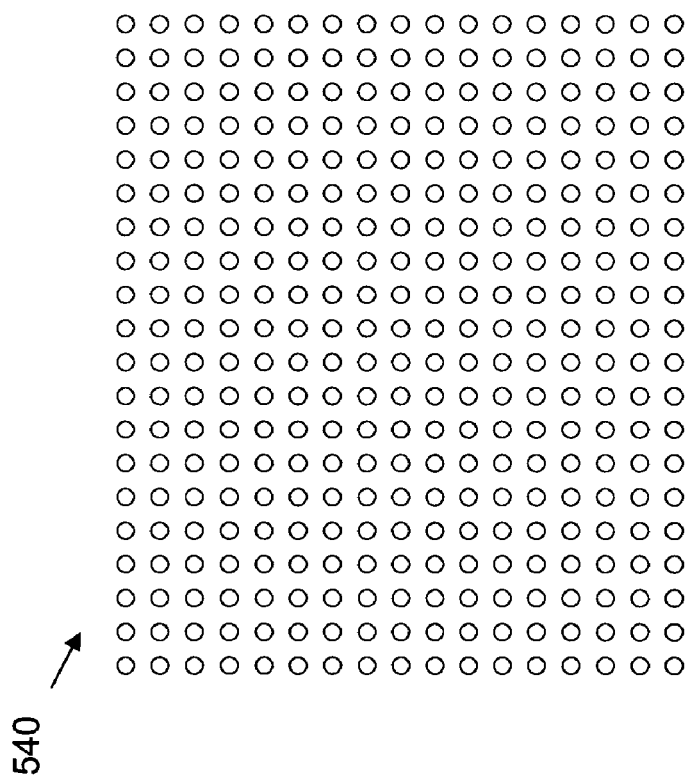
FIG. 6 illustrates an exemplary mask pattern for use in an optical servo system.

In one example, mask pattern 540 includes four bands of holes, one of which is illustrated in FIG. 6. In one example, the mask includes a hole pattern having a pitch of 24 μm and a diameter of 12 μm. It will be recognized that various other dimensions and mask patterns may be used, e.g., another mask pattern that may be used includes lines in the longitudinal direction with suitable spacing and dimensions to provide direction and relative motion information. The pattern on mask 540 may be one dimensional, comprising elements such as lines with suitable width and spacing, or a grating line pattern for increased light transmission. Additionally, a mask may include a pattern of varying transmissive materials to the light source.

When light diffracts over the edge of tape 100 and a diffraction pattern is projected and imaged onto the actuator mask 540, movement of mask 540 or light source 546 does not shift the diffraction pattern; rather, the movement creates an intensity change in the diffraction pattern, as measured by detector(s) 544. Maximum intensity occurs when the tape edge diffraction pattern covers or matches the actuator mask 540 pattern. As mask 540 is moved laterally with respect to the edge of tape 100 two effects observed: a slowly increasing intensity change; and a faster sinusoidal intensity change corresponding to each track crossing of the tape edge diffracted pattern with the actuator mask diffraction pattern.

Figure 7:
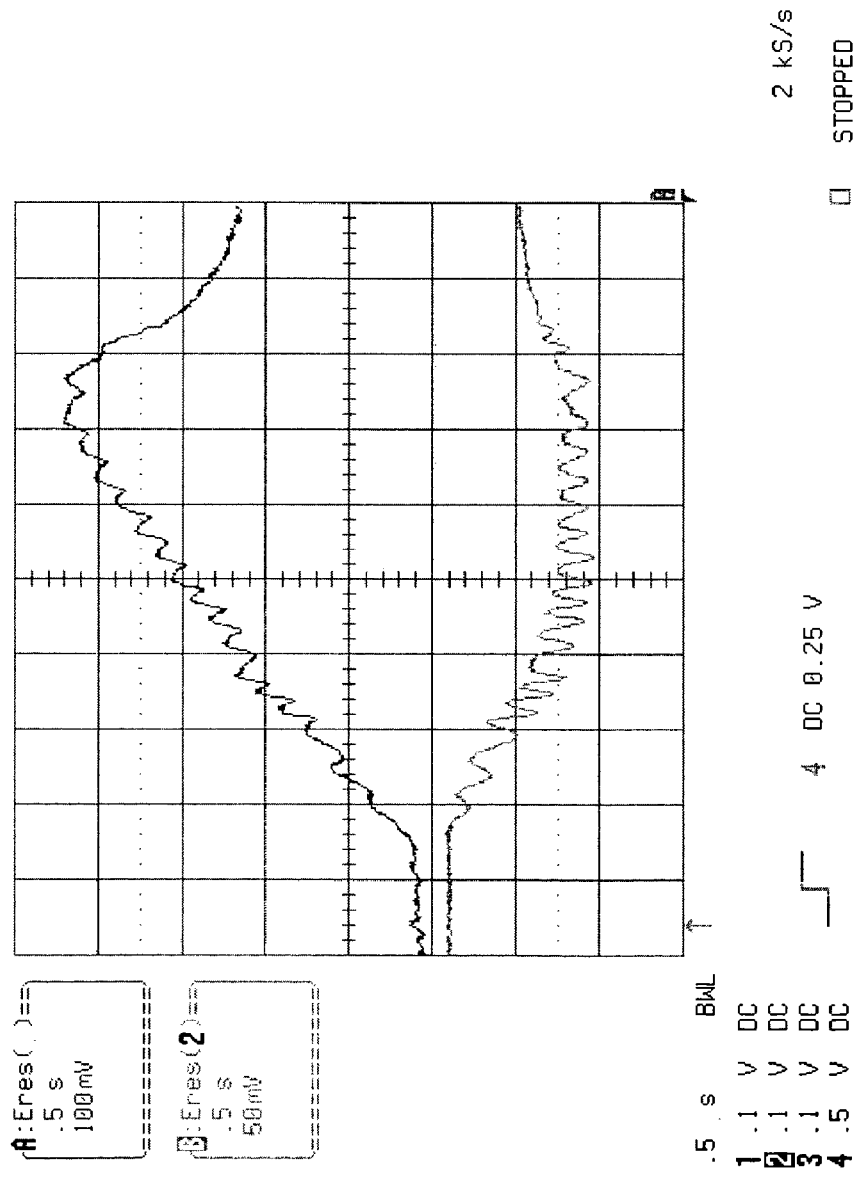
FIG. 7 illustrates an exemplary signal detected from an optical servo system.

From the output mask diffraction pattern, two of the orders (0, 0) and (0, −1) provide light levels that are out of phase with each other as a function of tape 100 or mask 540 lateral motion. The geometry of the system, e.g., the distance from the edge of tape 100 to mask 540, and the distance from mask 540 to detector 544, may be adjusted to provide varying amounts of phase difference between the two orders (0, 0) and (0, −1). In one example, the phase difference of the servo system is 90 degrees out of phase, e.g., as is the case with sine and cosine waveforms. It will be recognized by those of ordinary skill in the art that by using two waveforms that are 90 degrees out of phase both relative position and direction of motion of tape 100 to the transducer head may be derived. In one example, two photodetectors, one for each order of the diffraction pattern, allow the signals to be detected simultaneously. FIG. 7 illustrates scope traces displaying two orders in one example.

Provided mask 540 and the edge of tape 100 are properly aligned, there will be a single maximum light intensity track crossing. This maximum intensity track crossing occurs when the tape edge diffraction pattern is matched over the mask pattern. This signal is the reference point from which tracks can be determined. In the exemplary scope trace shown in FIG. 7, the maximum intensity track occurs on track 17.

It should be recognized by those of ordinary skill in the art that the exemplary servo methods for sensing the position of a tape edge are illustrative only and various modifications (including additions and subtractions of devices or actions) to the above methods and systems are possible. Additionally, various methods and systems may be used in combination with other optical tape edge servo methods and systems.

Magnetic Servo Methods and Systems:

Exemplary magnetic servo methods and systems that may be used in conjunction with optical servo methods and systems using the tape edge will now be described. According to one example, methods and systems are provided for sensing existing data structures on a magnetic storage tape to determine position information of the transducer head, e.g., using read signals from a reference data track. In one exemplary method, a first data track is written to a magnetic storage medium based on the ability of the drive system to maintain track position, e.g., through "open loop" control or other servo control methods, e.g., optical servo systems, available to the drive system. Subsequent data tracks are referenced from one or more existing or previously written data tracks (referred to herein as a "reference" data track). The first data track, n, becomes a reference track for the next adjacent track, n+1. As each successive data track is written a sensor, e.g., a read element, may continuously or intermittently monitor at least one previously written reference track(s) to provide relative position information. For example, if the read element and write element are fixed with respect to each other for a desired track width and spacing, a read signal indicating that the read element is drifting or offset from the reference track indicates to the servo system that the track being written is also drifting or offset from a desired position relative to the reference track.

Signals that can be used to determine the tracking information include, e.g., track average amplitude, average energy of the reference track, average energy of the read gate (or "rdgate") signal, PLL-locked/unlocked, transition from readable to unreadable data, k-bit, error rate information, signal noise, and other suitable read/write parametrics that change as a function of track offset as discussed above.

According to one exemplary method and system, a read/write head halts a read/write process at a predetermined time and the head is moved to locate an edge of a reference data track. The system may then register the location and boundaries (e.g., edges) of the reference data track relative to the active track and make adjustments to the position of the active track based on predetermined values or signals from the read head. The process of halting and checking the location of a reference data track may be periodically repeated as desired during writing a data track.

Figure 8:
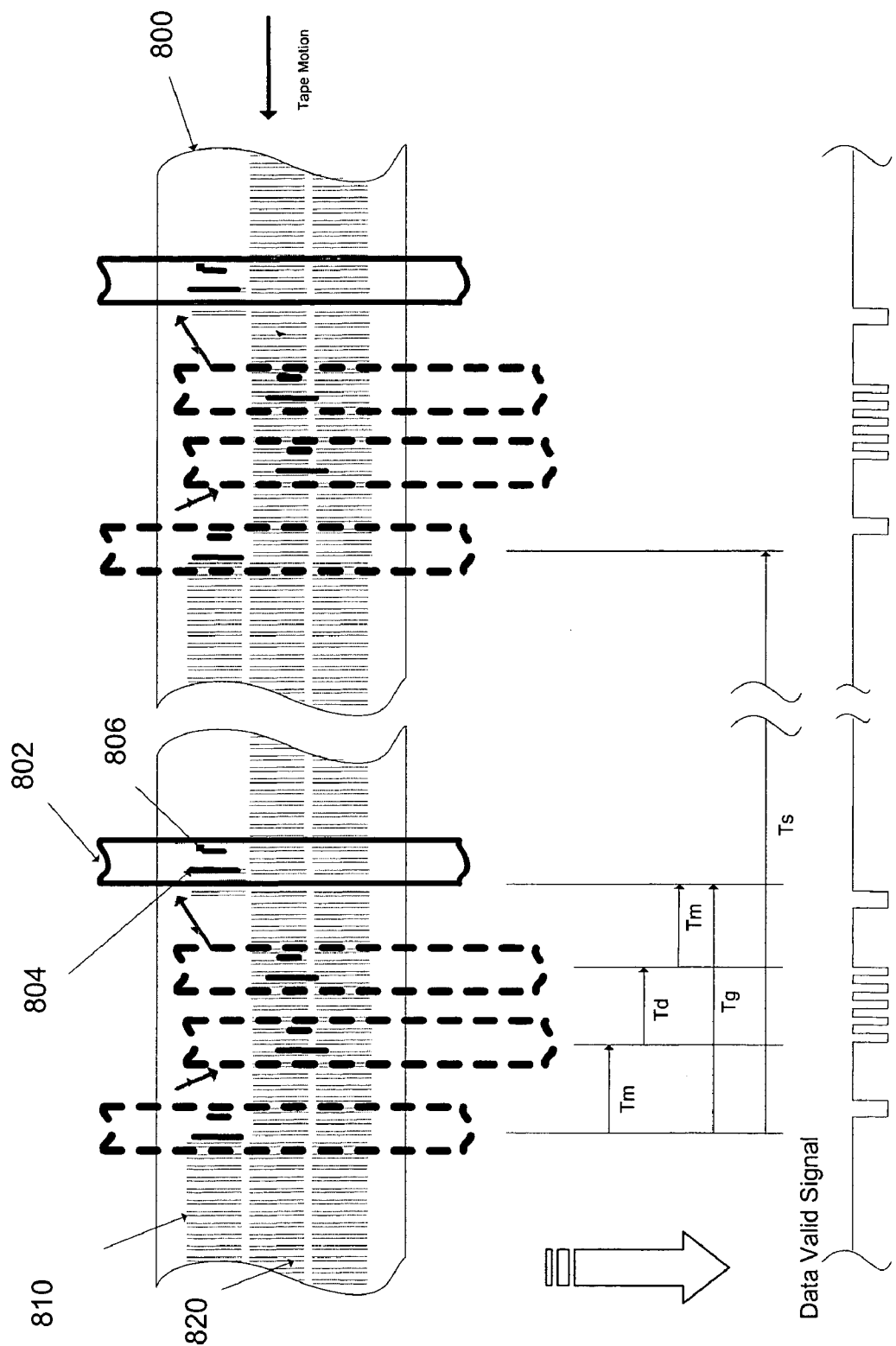
FIG. 8 illustrates an exemplary magnetic head assembly relative to a magnetic storage medium and corresponding read signals during a servo process.

With reference to FIG. 8, an exemplary method for determining relative position information during a write process is described. For a given read/write head 802 geometry, a drive servo system can read a previously written reference data track 820 and obtain information to fine adjust the position of head 802 over active track 810 (i.e., the track being accessed for either writing or reading data). In one example, the system uses data integrity read signals such as Read Channel Data Validity Resources of the tape drive and signal quality metrics of read element 806 positioned over reference track 820. A read signal quality metric may be monitored as head 802, including reference head 806, passes over reference track 820. For a given read/write head geometry, if the relative layout of the central position and/or edges of reference track 820 with respect to the location of the active track 810 are determined, the drive servo system can use this information to adjust the position of head 802 over track 810.

The Read Channel Data Validity Resources ("RCDVR") may provide a relay type signal (ON/OFF), referred to as a "Data Valid" signal (FIG. 8 "Data Valid Signal"), representative of the ability of the read element 806 to recover data based on any, or combination of any, of the following data validity indicators and signals:
1. Data amplitude valid
2. Data frequency/Phase valid (phase lock loop valid)
3. Data Block's Pre-amble/Post-amble amplitude and or phase/frequency and or sync signal valid
4. Data pattern Valid
5. Data Block's Pre-amble/Post-amble pattern valid The lower portion of FIG. 8 illustrates an exemplary read signal received from transducer head 802 that may determine the relative position of head 802 during operation. As the read element 806 of head 802 moves across the reference track 820, the data valid signal changes its state from "OFF" near the edge of reference track 820 where data is not valid to "ON" where the data become valid and back to OFF where the read element crosses the opposite edge of reference track 820. To check the track layout dimensions and to position write element 804 and read element 806 over reference track 820, the servo system may halt the read/write function over the active track 810 at specified time period (Track Layout Check period: Ts as shown in FIG. 8) and initiate a seek to and over the edges of reference track 820. By monitoring the state of the data valid signal and instantaneous relative position of head 802 with respect to the active track 810 location provided by the servo position-sensing device, the servo system registers the location and boundaries of reference track 820 relative to active track 810. The registered values, referred to as "Reference Position," are compared to nominal position values. If there are no substantial differences then the track layout is correct and the servo system may initiate a seek back to active track 810 to resume read/write functions with no further action until the next Track Layout Check time Ts. If there is a difference between the measured reference position and the nominal value, indicating a change in track layout or change in relative position of tape 800 and head 802, then the servo system initiates a seek back to active track 810 and modifies the reference position of the servo positioning loop to correct the track layout back to the nominal dimensions. The system then resumes read/write functions until the next Track Layout Check time Ts.

Since data is not retrieved from or written to active track 810 during a data track layout check in this example, periodic gaps without data are created within the data pattern of track 810. The length and duration of the gaps ("Tg") are determined by the duration of motion to and from the reference track ("Tm") and the time to accurately resolve the Data Valid information from the reference track ("Td"). The frequency rate of these gaps (Fs=1/Ts) determines correction bandwidth capability of this method and also the overhead to tape capacity. Generally, a higher frequency rate of track layout checks allows for faster correction, but reduces data capacity of the storage medium.

According to another exemplary method, during a read/write process of a data track or active track, and at a predetermined time, the read/write process is halted and a dedicated read element is moved to locate an edge of a reference data track. The system may then register the location and boundaries of the reference data track relative to the active track and make adjustments to the position of the active track based on predetermined values or signals from the read element. The process of halting and checking the location of a reference data track may be periodically repeated as desired during writing a data track.

Figure 9:
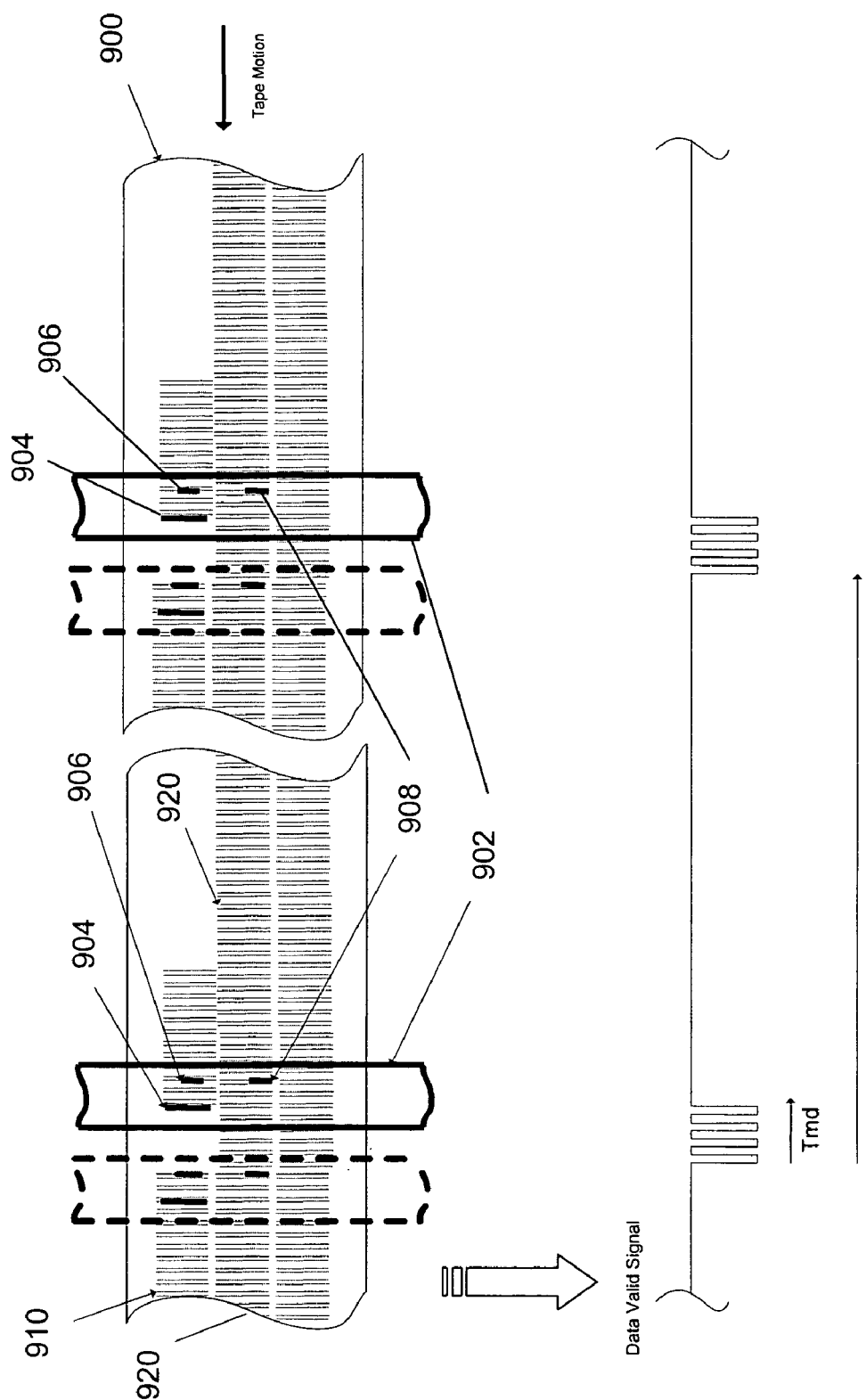
FIG. 9 illustrates another exemplary magnetic head assembly relative to a magnetic storage medium and corresponding read signals during a servo process.

FIG. 9 illustrates an exemplary system having a dedicated servo read element 908. The operation of the system of FIG. 9 is similar to the system of FIG. 8 except that a dedicated servo read element 908 is included with head assembly 902. Servo read element is positioned adjacent an edge of reference track 920 and therefore requires less movement of head 902 and lost tape capacity to reference one or more edges and/or the center position of reference track 920. In one example, the method and system uses RCDVR signals from dedicated servo read element 908 to determine the location of the active read element 906 and write element 904 with respect to the edge of reference track 920 as described previously. The positional information is then used to assist the servo system to adjust the read element 906 and write element 904 over active track 910.

According to another exemplary method, a dedicated read element provides a continuous read signal associated with the relative position of a reference data track with the location of the active track. The servo system may adjust the position of the head to a desired relative position with the reference data track based on the read signal.

Figure 10:
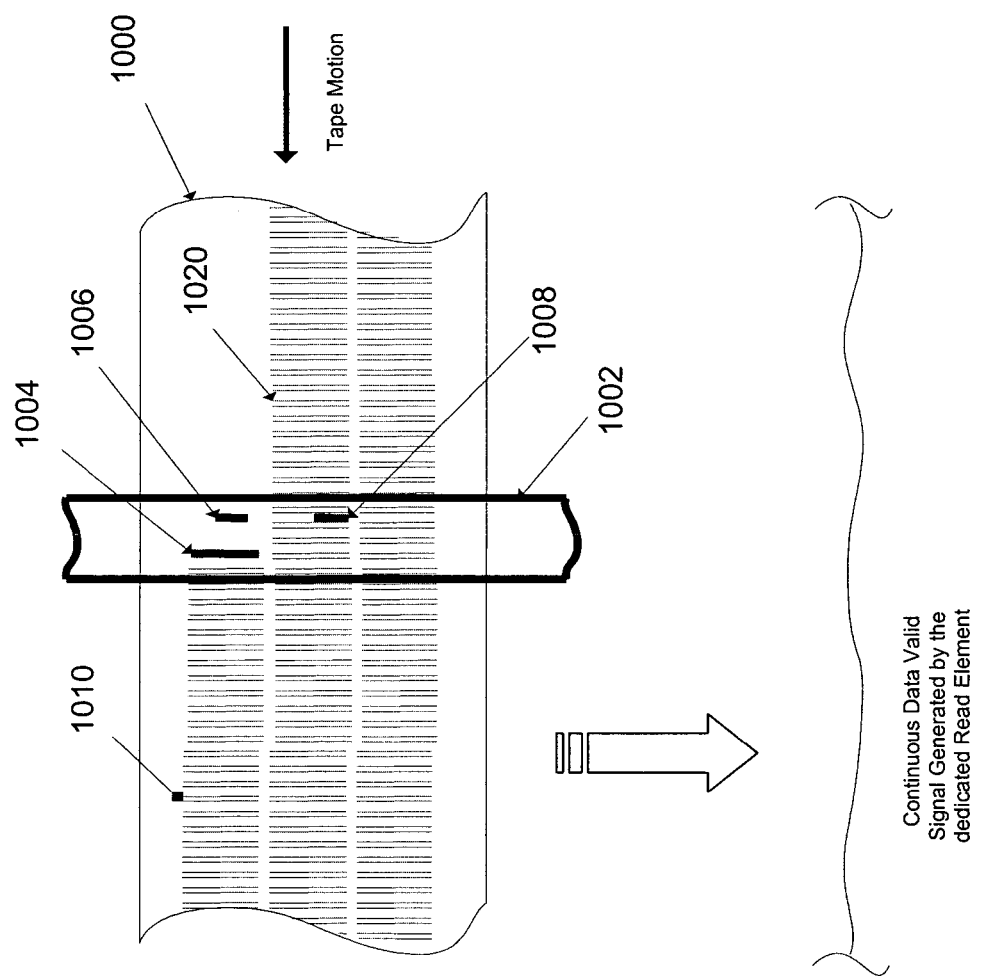
FIG. 10 illustrates another exemplary magnetic head assembly relative to a magnetic storage medium and corresponding read signals during a servo process.

In particular, FIG. 10 illustrates an exemplary system having a dedicated read element 1008 configured to provide a continuous read signal to the servo system. The operation of the system of FIG. 10 is similar to the system of FIG. 9 except that dedicated servo read element 1008 provides a continuous signal associated with the position of servo read element 1008 relative to reference track 1020. Accordingly, in this example, the servo system may make continuous position determinations and continuous adjustments to the position of head 1002. For example, as read element 1008 moves across the edge of reference track 1020, a read signal (or data valid signal) provides a linear signal proportional to the relative position of servo read element 1008 to the edge of reference track 1020. The read signal is used as a feed back positioning signal to enforce the tracking of the edge of reference track 1020 by the servo read element 1008. The design of head 1002 is such that, when servo read element 1008 tracks the edge of reference track 1020 the active read element 1006 and write element 1004 are positioned over active track 1010. Accordingly, the exemplary method supplies the servo system with a servo read signal for positioning head 1002 over desired track positions, laid out alongside and parallel to a previously written or reference track.

EXAMPLE II

In one example of the above method, firmware was written for a SDLT220 tape drive manufactured by Quantum Corporation. The firmware utilized the optical tracking servo system of the SDLT220 with "assistance" from reading the edge of an adjacent reference track. A Read Gate signal is generated by the SDLT220 read channel that indicates whether the read channel has read a good block of data. If the Read Gate signal is greater than a predetermined value, then the data block was good. Conversely, if the Read Gate signal is below the predetermined value, then the data block was bad.

Several data tracks were written in standard SDLT220 mode. The data tracks were then read. After the SDLT220 optical servo locked the head onto the center of a data track, the Read Gate signal was sampled by the servo system at a frequency of 10 KHz for 7.5 milliseconds. If the majority of the samples were good, then an offset was added to the current optical servo position to move the head farther from the center of the Active Track. If the majority of the samples were bad, then an offset was added to the current optical servo position to move the head closer to the center of the Active Track. This procedure of sampling the Read Gate signal and then adding or subtracting an offset to the current optical servo position was repeated continuously along the length of tape. The head gradually moved to the edge of the Active Track and continued to follow the edge of the Active Track along the length of the tape.

A subsequent test was performed where several data tracks were written using standard SDLT220 optical servo system, but a 10 Hz sinusoidal frequency was injected into the optical servo signal path, causing the servo to write the data tracks with a 10 Hz sinusoidal deviation from the nominal position. When the data tracks were then read using the method described above, the head followed the 10 Hz signal that was injected during the write process.

Exemplary transducer heads that may be used with one or more of the above described methods and systems are now described. One exemplary head design includes a center tapped head having two read elements, where at least one read element is a dedicated servo read element to derive servo positioning information from a reference data track.

Figure 11:
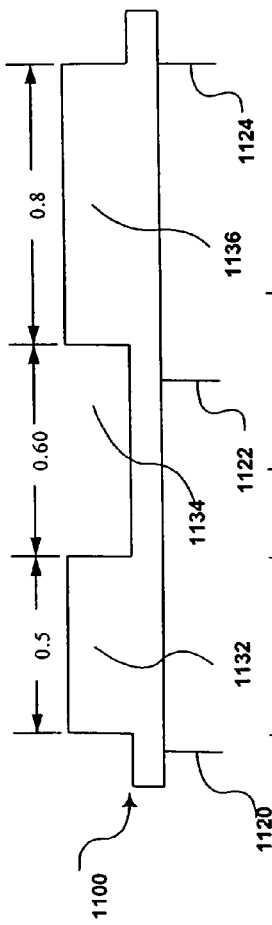
FIGS. 11–15 illustrate various exemplary magnetic head configurations.

FIG. 11 illustrates an exemplary center tapped head 1100 with two effective read elements 1132 and 1136. In operation, read element 1132 is configured to be positioned on the center of an active track and is approximately 0.50 track widths. Read element 1136 is approximately 0.8 track widths and separated 0.60 track widths away from read element 1132 by recess 1134. Read element 1136 is configured to be positioned on the reference track center. The dimensions of the second read element 1136, in this example 0.8 track widths, are at the limits of track qualifiers, which may provide for fine track positioning. The portion of head 1100 including read elements 1132 and 1136 includes one magneto-resistive strip. The electrical connections of head 700 are such that the data read element lead 1120 and the servo read element lead 1124, are independent from common lead 1122.

Figure 12:
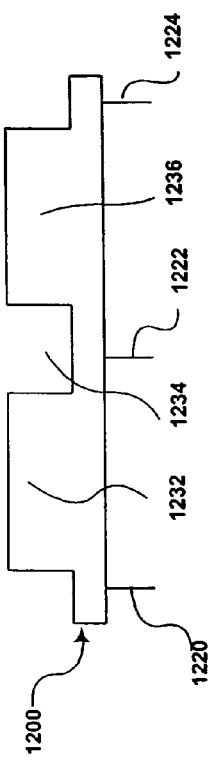

FIG. 12 illustrates an exemplary head 1200. In this example, head 1200 is center tapped with two read elements 1232 and 1236, where read element 1232 is 0.5 track widths and positioned at the center of the active track, and read element 1236 is also 0.5 track widths and separated 0.25 track widths away from read element 1232 by recess 1234. In this configuration, read element 1236 is aligned with an adjacent reference track edge and may sense track qualifiers or the like for positioning information.

Figure 13:
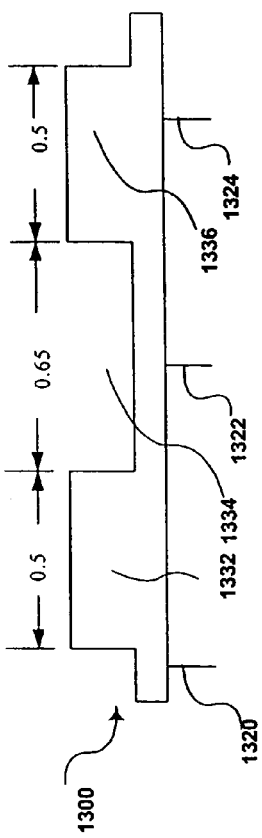

FIG. 13 illustrates an exemplary head 1300. In this example, head 1300 is center tapped with two read elements 1332 and 1336. The configuration of head 1300 is similar to FIG. 12, except that recess 1334 is 0.65 track widths such that read element 1336 is configured to be aligned with the opposite or far edge of an adjacent reference track.

Figure 14:
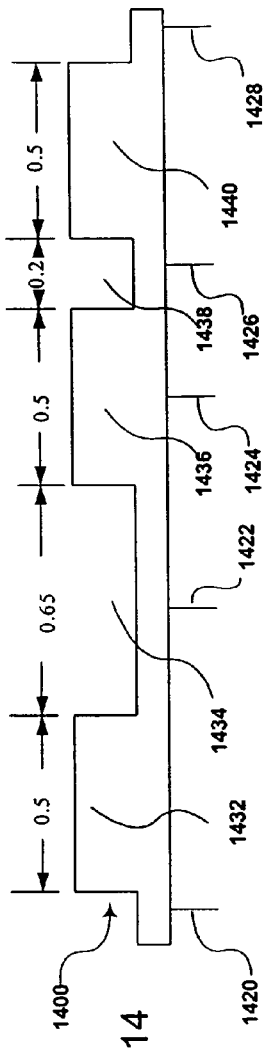

FIG. 14 illustrates an exemplary head 1400 with multiple taps and multiple read elements. Head 1400 includes three read elements 1432, 1436, and 1440 separated by recesses 1434 and 1438. The first read element 32 is configured to read the active track and is positioned nominally at track center. The second read element 1436 is positioned near a reference track edge, e.g., on the edge of track n–1 near edge n–2. The third read element 1440 is positioned on a second reference track, e.g., on the edge of track n–2 near n–1. Head 1400 may be used is a push-pull configuration with two read elements sensing servo qualifiers from the track edge at the n–1 and n–2 boundary. Head 1400 further includes common lead 1426 and read element lead 1428 to support read element 1440.

Figure 15:
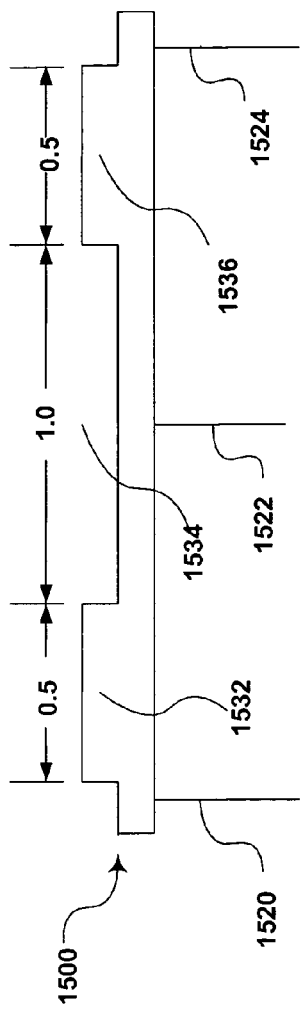

FIG. 15 illustrates an exemplary head 1500. Head 1500 includes read element 1532, which is 0.5 track widths and positioned 1.5 track widths away from the center of servo read element 1536. The separation formed by recess 1534 between read element 1532 and read element 1536 is 1.0 track width such that read element 1536 straddles two adjacent data tracks and may detect phase gaps between data blocks to provide relative position information.

Figure 16:
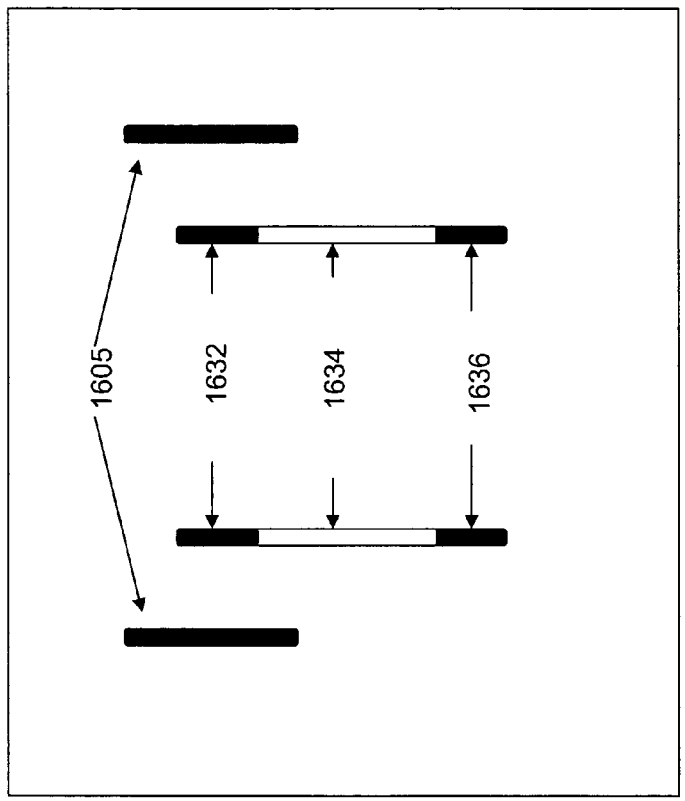
FIG. 16 illustrates one channel of an exemplary read-write multi-channel head.

FIG. 16 illustrates the relative geometry of a typical read-write multi-channel head using the center tapped data and servo read element. In particular, write elements 1605 are shown in relation to data read elements 1632 and servo read elements 1636 for one channel.

It should be recognized by those of ordinary skill in the art that the exemplary heads and servo read element configurations are illustrative only. Various other configurations to read one or more reference tracks and provide servo information to a servo system are possible.

Tape Drive Systems and Associated Methods:

According to another aspect, a tape drive system is provided that may receive and drive storage tape cartridges of varying formats, e.g., an SDLT tape cartridge, an LTO tape cartridge, and the like. In one example, the tape drive system includes suitable guide rails that laterally displace the cartridge to co-locate the cartridge within a receiver and with a tape drive motor drive mechanism, e.g., a drive reel, which may be configured with two or more gears to selectively engage and drive different cartridge reel formats. Additionally, sensors, e.g., mechanical or optical sensors, may be included in the cartridge receiver to identify the tape cartridge, e.g., SDLT, LTO, or the like, to ensure suitable location of the cartridge within the tape drive system and suitable take-up of the cartridge leader by the drive leader system. The drive leader system may include multiple buckle mechanisms attached to the drive leader and positioned within the drive system to engage different cartridge leader formats or a single buckle mechanism capable of engaging different cartridge leaders at various locations within the drive. The exemplary methods and systems are described herein as compatible with SDLT and LTO cartridges (and their associated data formats) for illustrative purposes only, and it is noted that the exemplary methods and drive systems may be (and are contemplated to be) modified for additional or different tape cartridges formats and data formats.

Figure 17:
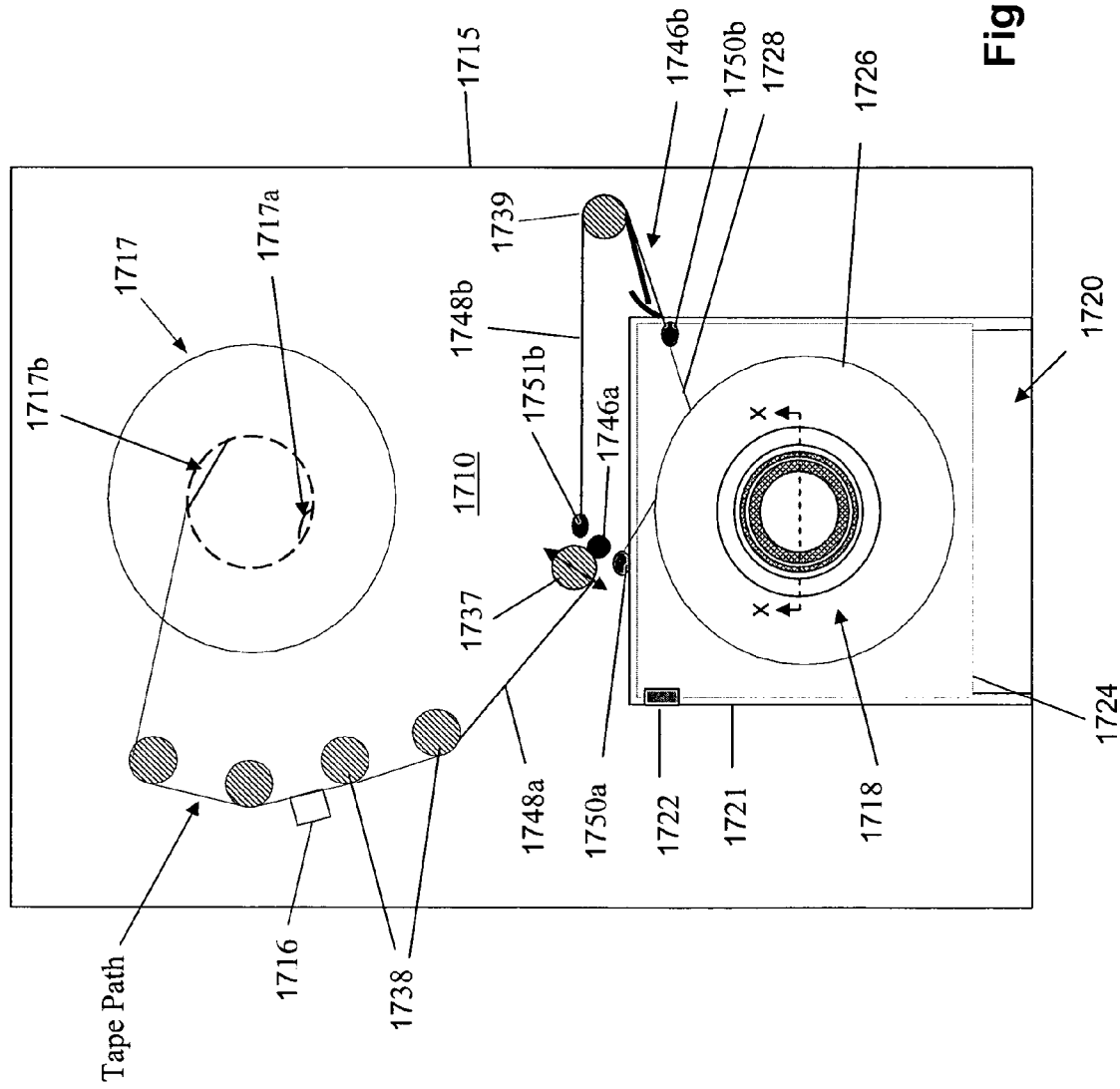
FIG. 17 illustrates an exemplary tape drive system configured to receive and read/write various cartridge formats and data formats.

Referring initially to FIG. 17, an exemplary tape drive 1710 is illustrated. Tape drive 1710 includes a tape drive housing 1715, a data transducer, i.e., read and/or write head 1716, a take-up reel 1717, and a receiver 1720. Tape drive 1710 is used in conjunction with cartridge 1724 (shown in outline within receiver 1720), which houses a storage tape 1728 on supply reel 1726. Receiver slot 1720 is configured to receive a suitable cartridge 1724 therein adjacent reel driver assembly 1718. Tape drive 1710 may also include a door and various mechanisms for receiving and identifying cartridge 1724, such as guide rails 1721, cartridge sensors 1722, and the like.

When cartridge 1724 is received in receiver slot 1720, a buckler system including buckling mechanism 1746a or 1746b engages a cartridge pin or buckle, e.g., cartridge leader pin 1750a or 1750b (corresponding to two possible cartridge formats), and streams storage tape 1728 along a generally common tape path within tape drive 1710 passing read/write head 1716 and onto take-up reel 1717. The tape path may include various tape guides 1739, rollers 1738, one or more read/write heads 1716, and the like before being wound upon take-up reel 1717. Take-up reel 1717 includes discontinuities 1717a and 1717b to receive buckle mechanisms 1746a and 1746b respectively.

Tape drive 1710 is typically installed within or associated with a computer (not shown) or computer network. Additionally, tape drive 1710 may be used as part of an automated tape library having a plurality of tape cartridges and a robotic transfer mechanism to transport cartridges to one or more tape drives. An exemplary storage library is described in U.S. Pat. No. 5,760,995, entitled "MULTI-DRIVE, MULTI-MAGAZINE MASS STORAGE AND RETRIEVAL UNIT FOR TAPE CARTRIDGES," which is hereby incorporated by reference in its entirety.

Various other features of a tape drive may be included, for example, various buckler motors, rollers, tape guides, receiving mechanisms, dampers, and the like may be used. A detailed description of various components of a tape drive system that may be used is provided in U.S. Pat. No. 6,095,445, entitled "CARTRIDGE BUCKLER FOR A TAPE DRIVE," which is incorporated herein by reference in its entirety.

According to one aspect of drive 1710, a drive leader system is provided to accommodate different cartridge formats that will be loaded into drive 1710. The drive leader system includes a first buckling mechanism 1746a, e.g., an SDLT buckling mechanism, and a second buckling mechanism 1746b, e.g., an LTO buckling mechanism, positioned at expected locations of cartridge leader pins for the different cartridge formats. The SDLT and LTO cartridges and respective tape drives employ different apparatuses for buckling the drive leader to the cartridge media. Furthermore, the position of egress of the media varies across the different cartridges. For example, for an SDLT cartridge, the media exits from the rear of the cartridge and for an LTO cartridge, the media exits from a side of the cartridge (to the right side in this configuration). Accordingly, buckle mechanisms 1746a and 1746b are disposed in suitable positions with suitable buckling mechanisms to engage and stream storage tape from the different cartridge formats.

Figures 18A, 18B:
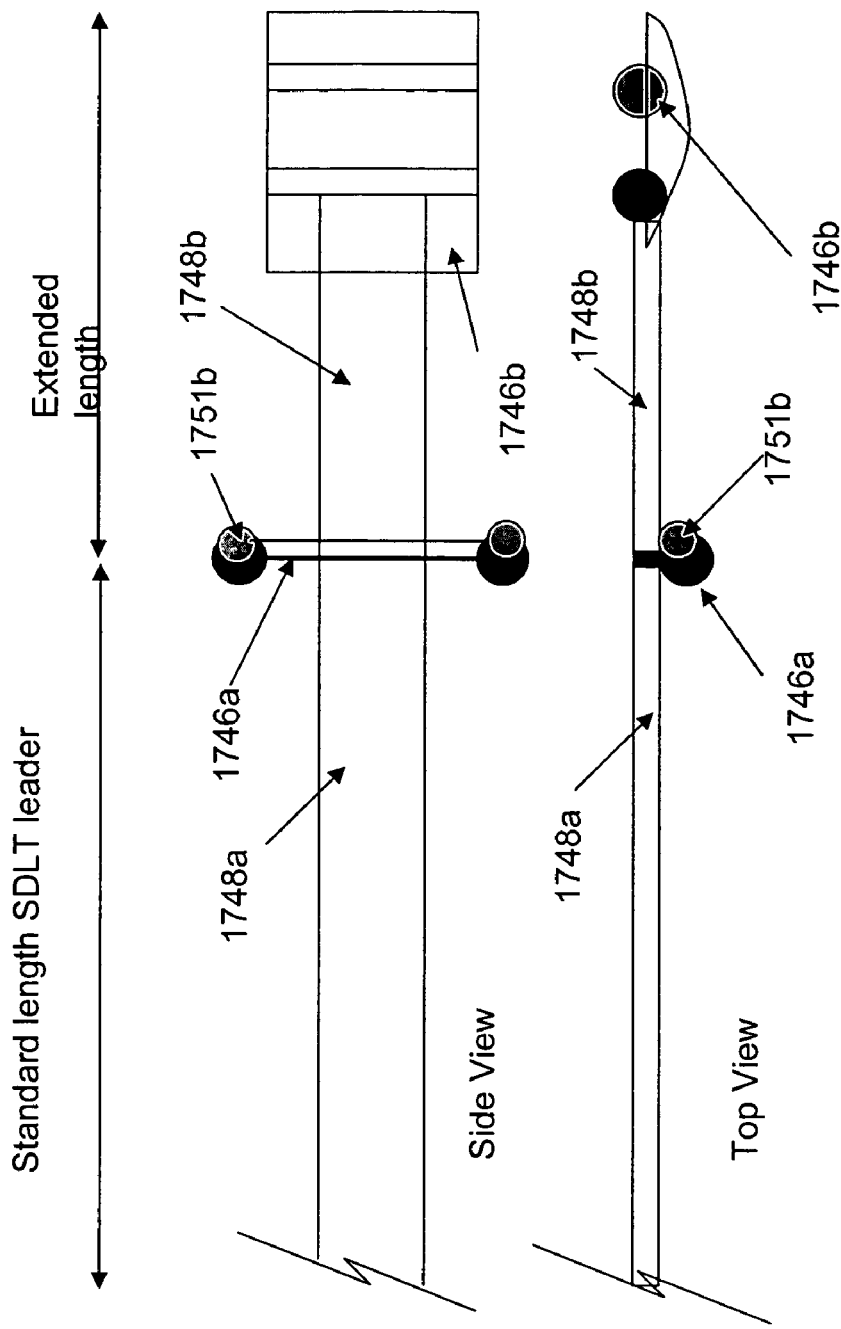
FIGS. 18A and 18B illustrate an exemplary drive leader including buckle mechanisms.

As illustrated in FIGS. 18A and 18B, the drive leader in this example includes a leader portion similar to a standard SDLT leader with buckle mechanism 1746a. The drive leader includes a second portion or additional length to accommodate a second buckle mechanism 1746b and extend to the position of the LTO cartridge leader when it is inserted into drive 1710. In this example, buckling mechanisms 1746a and 1746b are configured and located to attach to SDLT and LTO cartridge pin leaders 1750a and 1750b such that tape 1728 can be pulled through a common tape path, similar to a conventional SDLT tape path. In other examples, however, tape 1728 may be pulled through a common tape path similar to a conventional LTO tape path with appropriate modifications to the drive and leader system. The addition of new guides or rollers, e.g., guide 1739 (see FIG. 17), may be located to accommodate the longer tape path used with other cartridge formats, e.g., the LTO cartridge. It is noted that for use with other 0.5 inch cartridge formats, e.g., DLT, 3590, 8940, and the like, various multiple format buckle systems are contemplated and possible.

Sensor 1722, for example, may detect the type of cartridge during or after insertion into the tape drive and initiate an appropriate buckling sequence for the particular cartridge. Sensor 1722 may include an optical or mechanical sensor and may be located in various locations with respect to receiver 1720. Additionally, identification of the cartridge may be manual. Once the cartridge is identified, a buckler motor or mechanism associated with the drive leader system may selectively engage leader pin 1750a or 1750b. In one example, guide 1737b moves to connect buckle mechanism 1746a either with pin 1750a for a first cartridge format or drive leader pin 1751b and second leader portion 1748b for a second cartridge format. Second leader portion 1748b further engages pin 1750b through buckle mechanism 1746b for the second cartridge format. When engaged, the drive leader 1748a and 1748b (if applicable) is pulled through the tape path and wound onto take up reel 1717.

Guide 1737 may include various mechanisms to translate and/or rotate buckle mechanism 1746a to select a cartridge leader or the driver leader portion 1748b (e.g., pins 1750a or 1751b). Additionally, the hub of take-up reel 1717 is shaped with features 1717a and 1717b to accommodate the two buckling mechanisms 1746a and 1746b in order to produce a substantially uniformly cylindrical surface for the remainder of the tape to be wound onto. It is noted that certain cartridges includes a stiff leader, e.g., SDLT cartridges, to assist in creating a substantially uniform surface for tape 1728 to be wound on despite minor discontinuities in the surface of a take-up reel.

Figure 19:
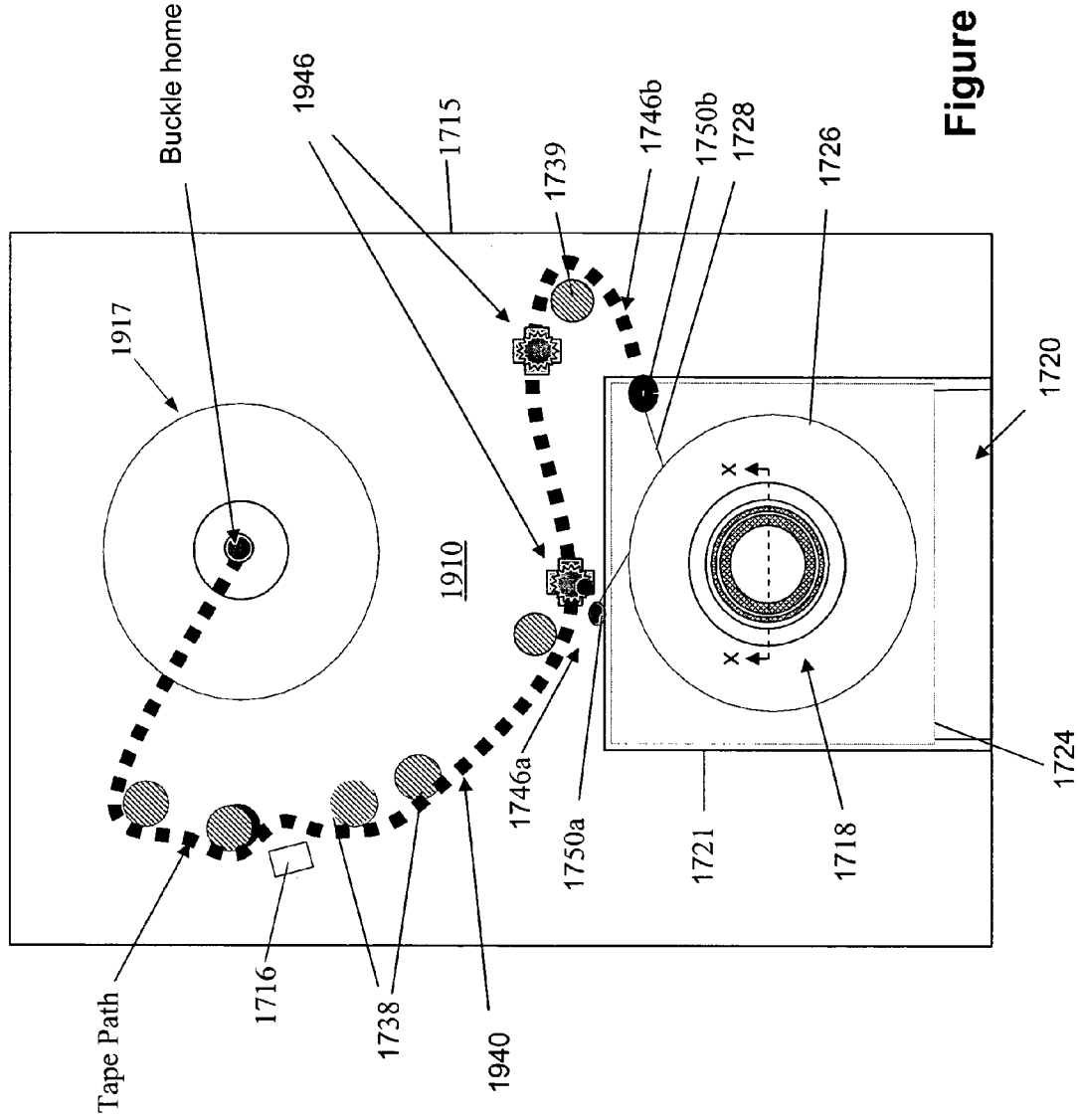
FIG. 19 illustrates an exemplary tape drive system configured to receive and read/write various cartridge formats and data formats.

FIG. 19 illustrates another exemplary drive 1910. Drive 1910 is similar to drive 1710, except the drive leader system includes a traveling buckle mechanism 1946 which moves through drive 1910 along track 1940 by expected locations of cartridge leader pins. In this example, buckle track 1940 leads from a position adjacent receiver 1720 and takes a path by expected leader pin locations, e.g., 1750a and 1750b, and through the system by head 1716 and to take-up reel 1917. Buckle 1946 will thread storage tape 1728 through the system and stop at the center of reel 1917 where buckle 1946 rotates with reel 1917 as storage tape 1728 is taken up on reel 1917. In one example, buckle mechanism 1946 fits within the inner diameter of reel 1917 forming a smooth inner surface for storage tape 1728 to be wound upon.

Drives 1710 and 1910 illustrated in FIGS. 17 and 19 may also be configured with head 1716 positioned on an opposite side of the tape path as presently illustrated, e.g., on the inside of the tape path near the center of drive 1710 with the contact surface of head 1716 facing away from reel 1717. In such an instance, the cartridge loading and threading is reversed. In particular, the exemplary cartridge pin locations and egresses for varying cartridge leader formats would be reversed, e.g., cartridge pin 1750b located and exiting to the left of receiver 1720 and cartridge leader pin 1750a exiting to the back and right of receiver 1720. Guide rollers 1738, 1739, and the like would be positioned appropriately to allow the drive leader system to engage and take-up cartridge pins 1750a and 1750b similarly to the operation described with reference to FIG. 17.

Those of ordinary skill in the art will recognize that various buckle tracks and mechanisms are possible and may include various paths through the drive to accommodate any number of different cartridge formats, e.g., pin types, tape egress, and the like. Additionally, the drive leader system may include one or more buckle mechanisms that may be selectively activated to engage and stream varying cartridge leaders through the drive system.

Figure 20:
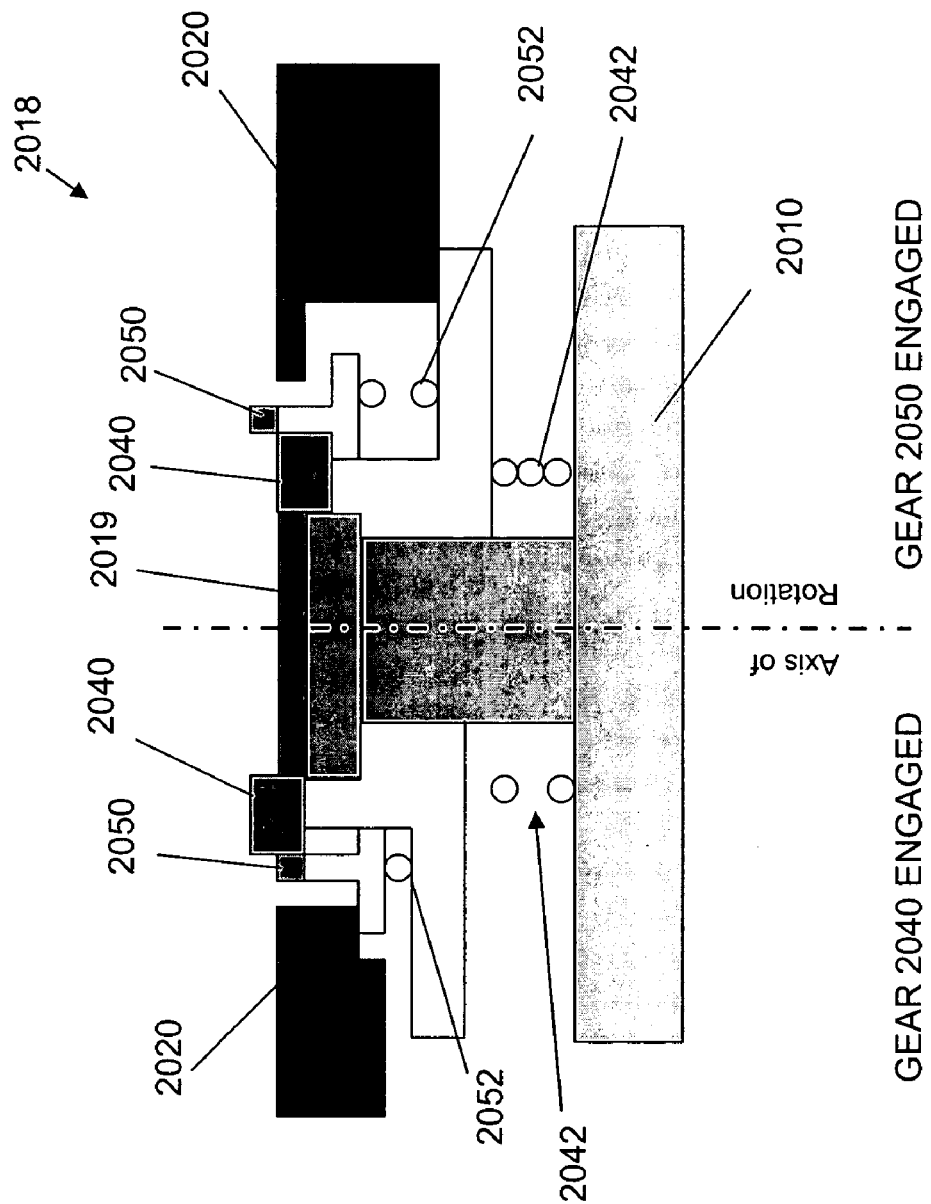
FIG. 20 illustrates an exemplary reel driver.

According to another aspect of an exemplary drive system, a dual reel driver 2018 is provided that may receive and drive cartridges having varying gear radii and gear tooth pitch. FIG. 20 illustrates a cross-sectional view of an exemplary dual tooth reel driver 2018. On the left side of FIG. 20, i.e., to the left of the line indicating the axis of rotation, reel driver 2018 is configured for a first gear tooth format, e.g., to engage an SDLT cartridge 48 tooth gear. On the right side of FIG. 20, to the right of the line indicating the axis of rotation, reel driver 2018 is configured for a second gear tooth format, e.g., to engage an LTO Ultrium cartridge 60 tooth gear. In particular, reel driver 2018 includes two concentric independently spring loaded gears 2040 and 2050, e.g., configured to drive either a 48 tooth SDLT cartridge or a 60 tooth LTO Ultrium cartridge. Gear 2040 is engaged by releasing spring 2042 thereby raising gear 2040 to engage a cartridge. In one example, spring 2042 is released by rotating a control ring 2020 having a suitable lower surface to allow gear 2040 to translate a first direction (up) along the axis of rotation in a first position and translate a second direction (down) along the axis of rotation in a second position. In this example, for an SDLT cartridge, control ring 2020 is driven clockwise allowing spring loaded gear 2040, e.g., a 48 tooth gear, to be raised above gear 2050, e.g., a 60 tooth gear, thus engaging the SDLT cartridge. Additionally, a permanent magnet 2019 may be positioned in the center of the gear assembly to lock a suitable SDLT cartridge in position.

Alternatively, control ring 2020 may be driven clockwise to force gear 2040 down and allow gear 2050 to translate above gear 2040 as shown on the right side of FIG. 20. For example, the lower surface of control ring 2020 may be contoured such that rotation allows springs 2052 to force gear 2050 up to engage a suitable cartridge while simultaneously forcing gear 2040 down. Additionally, permanent magnet 2019 may be positioned in the center of the gear assembly to lock an LTO Ultrium cartridge in position. It will be recognized by those of ordinary skill in the art that other mechanisms are possible to alternate between two or more gear sets in a reel driver. For example, separate lifting mechanisms including, e.g., lead screws, springs, and the like, may selectively raise and lower gears 2040 and 2050.

In other examples, where compatibility is desired for additional or different cartridge formats, various aspects of the drive may be modified to suit the dimensions and configurations of the cartridges. For example, additional and/or different gears may be used in the drive reel; additional and/or different buckle mechanisms may be used with the cartridge leader as well as different tape paths; and various sensors may be used to identify cartridge formats.

The above detailed description is provided to illustrate exemplary embodiments and is not intended to be limiting. It will be apparent to those of ordinary skill in the art that numerous modification and variations within the scope of the present invention are possible. For example, various exemplary methods and systems described herein may be used alone or in combination with various other positional and/or servo methods and systems whether described herein or otherwise including, e.g., optical or magnetic servo methods and systems. Additionally, particular examples have been discussed and how these examples are thought to address certain disadvantages in related art. This discussion is not meant, however, to restrict the various examples to methods and/or systems that actually address or solve the disadvantages.

The invention claimed is:

1. A tape drive system for use with multiple cartridge formats, the tape drive system comprising:
   a receiver;
   a reel driver system configured to drive at least two cartridges having different cartridge formats; and
   a drive leader system configured to selectively couple with at least two cartridge leaders having different cartridge leader formats associated with the at least two different cartridge formats, wherein the at least two different cartridge leader formats vary in one or more of leader pin location and egress of storage tape from a cartridge housing.

2. The tape drive system of claim 1, wherein the at least two different cartridge leader formats vary in both leader pin location and egress of storage tape from a cartridge housing.

3. The tape drive system of claim 1, wherein the at least two different cartridge formats vary in one or more of cartridge size, cartridge shape, and cartridge reel configuration.

4. The tape drive system of claim 1, wherein the reel driver system includes two gears for selectively engaging the at least two different cartridge formats.

5. The tape drive system of claim 1, wherein the reel driver system includes two gears varying in radius and tooth pitch.

6. The tape drive system of claim 1, wherein the reel driver system includes two gears and a control ring that may be rotated to selectively extend one of the two gears to engage a cartridge, the control ring including a contoured surface to extend and retract the two gears separately during rotation.

7. The tape drive system of claim 1, wherein the reel driver system includes two gears, wherein a first gear is configured for an SDLT cartridge and a second gear is configured for an LTO cartridge.

8. The tape drive system of claim 1, wherein the reel driver system includes a permanent magnet located at the axis of rotation of a gear assembly.

9. The tape drive system of claim 1, wherein the leader system includes at least two buckling mechanisms disposed in different locations relative to the receiver.

10. The tape drive system of claim 1, wherein the leader system includes a first drive leader portion configured to selectively couple with a first cartridge leader or a second drive leader portion, the second drive leader portion configured to couple with a second cartridge leader, the first and second cartridge leaders having different cartridge leader formats.

11. The tape drive system of claim 10, wherein a guide moves the first drive leader portion to couple with the first cartridge leader or the second driver leader portion.

12. The tape drive system of claim 1, wherein the leader system includes a track on which at least one buckle mechanism travels to attach to the at least two different cartridge leaders.

13. The tape drive system of claim 1, wherein the leader system includes a track on which at least one buckle mechanism travels to attach to the at least two different cartridge leaders at least two different locations.

14. The tape drive system of claim 1, wherein the leader system includes a buckle mechanism configured to couple with an SDLT cartridge leader pin and a buckle mechanism configured to couple with an LTO cartridge leader pin.

15. The tape drive system of claim 1, further including a take-up reel, the take-up reel including at least one discontinuity on the inner surface to accommodate a buckle mechanism associated with the leader system.

16. The tape drive system of claim 1, further including a receiver having adjustable rails configured to locate the at least two different cartridge formats over the reel driver system.

17. The tape drive system of claim 1, further including a sensor configured to identify a cartridge format.

18. The tape drive system of claim 17, wherein the sensor includes at least one of a mechanical and optical sensor.

19. A tape drive leader system comprising:
   a first drive leader portion; and
   at least one buckle mechanism, wherein the at least one buckle mechanism is configured to couple with at least two cartridge leaders having different cartridge leader formats, and the first drive leader portion is configured to selectively couple with a first cartridge leader having a first format or a second drive leader portion, the second drive leader portion configured to couple with a second cartridge leader having a second format.

20. The drive leader system of claim 19, wherein the at least two different cartridge leader formats vary in at least one of leader pin, leader pin location, and egress of storage tape from a cartridge housing.

21. The drive leader system of claim 19, further including at least two buckling mechanisms disposed in different locations relative to a drive receiver.

22. The drive leader system of claim 19, further including a guide system that moves the first drive leader portion to couple with the first cartridge leader or the second driver leader portion.

23. The drive leader system of claim 19, wherein the leader system includes a buckle mechanism configured to couple with an SDLT cartridge leader pin and a buckle mechanism configured to couple with an LTO cartridge leader pin.

24. A tape drive leader system comprising:
   at least one buckle mechanism, wherein the at least one buckle mechanism is configured to couple with at least two cartridge leaders having different cartridge leader formats; and a track on which the at least one buckle mechanism may travel along to attach to the at least two cartridge leaders.

25. The drive leader system of claim 24, wherein the buckle mechanism attaches with the at least two cartridge leaders in two different locations.

26. The drive leader system of claim 24, wherein the at least two different cartridge leader formats vary in at least one of leader pin, leader pin location, and egress of storage tape from a cartridge housing.

27. The drive leader system of claim 24, wherein the leader system includes a buckle mechanism configured to couple with an SDLT cartridge leader pin and a buckle mechanism configured to couple with an LTO cartridge leader pin.

28. A method for buckling a drive leader system of a tape drive to cartridges having two or more cartridge leader formats, the method comprising:
  positioning a cartridge within a receiver of a tape drive, the cartridge including a cartridge leader; and
  selectively engaging the cartridge leader with a drive leader system at one of at least two separate locations to provide one of at least two different egresses of storage tape from the cartridge into the tape drive.

29. The method of claim 28, wherein the drive leader system includes a first drive leader portion configured to selectively couple with a first cartridge leader format or a second drive leader portion, the second drive leader portion configured to couple with a second cartridge leader format.

30. The method of claim 28, wherein the drive leader system includes a track on which at least one buckle mechanism travels to attach to the cartridge leader.

31. The method of claim 28, further comprising selectively engaging the cartridge reel with a drive reel system, the drive reel system including at least two different drive reels for driving varying cartridge reel formats.

32. A method for buckling a drive leader system of a tape drive to cartridges having at least to different cartridge leader formats, the method comprising:
  positioning a cartridge within a receiver of a tape drive, the cartridge including a cartridge leader; and
  selectively engaging the cartridge leader with a drive leader system configured to couple with at least two different cartridge leader formats, the two different cartridge leader formats varying in one or more of leader pin location and egress of storage tape from the cartridge.

33. The method of claim 32, further comprising selectively engaging the cartridge reel with a drive reel system, the drive reel system including at least two different drive reels for driving varying cartridge reel formats.

34. A tape drive system for use with multiple cartridge formats, the tape drive system comprising:
  a receiver; and
  a drive leader system configured to selectively couple with at least two cartridge leaders having different cartridge leader formats associated with at least two different cartridge formats, wherein the cartridge leader formats vary in the size of the leader pin.

35. The tape drive system of claim 34, further comprising a reel driver system configured to drive the at least two cartridges having different cartridge formats, wherein the at least two different cartridge formats vary in cartridge size.

36. The tape drive system of claim 34, wherein the at least two different cartridge formats vary in reel configuration.

37. The tape drive system of claim 34, wherein the at least two different cartridge formats include an SDLT cartridge format and an LTO cartridge format.

38. The tape drive system of claim 34, wherein the reel driver system comprises two gears for engaging the at least two different cartridge formats.

39. The tape drive system of claim 34, wherein the at least two different cartridge leader formats vary in at least one of leader pin location or egress of storage tape from a cartridge housing.

40. A tape drive system for use with multiple cartridge formats, the tape drive system comprising:
  a receiver;
  a reel driver system configured to drive at least two cartridges having different cartridge formats, wherein the reel driver system includes two gears for selectively engaging the at least two different cartridge formats; and
  a drive leader system configured to selectively couple with at least two cartridge leaders having different cartridge leader formats associated with the at least two different cartridge formats.

41. The tape drive system of claim 40, wherein the two gears vary in radius and tooth pitch.

* * * * *